US006965643B1

(12) United States Patent
Maeda et al.

(10) Patent No.: US 6,965,643 B1
(45) Date of Patent: Nov. 15, 2005

(54) IMAGE PROCESSING APPARATUS AND METHOD, AND STORAGE MEDIUM STORING IMAGE PROCESSING PROGRAM

(75) Inventors: Mitsuru Maeda, Tokyo (JP); Hiroshi Inoue, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/459,859

(22) Filed: Dec. 14, 1999

(30) Foreign Application Priority Data

Dec. 18, 1998 (JP) ................................. 10-360772
Apr. 16, 1999 (JP) ................................. 11-109293

(51) Int. Cl.⁷ ............................................. H04N 7/18
(52) U.S. Cl. ......................... 375/240.12; 375/240.13; 375/240.25; 375/240.28
(58) Field of Search ........ 348/143–160; 725/105–107; 375/240.11–240.29

(56) References Cited

U.S. PATENT DOCUMENTS

| 5,353,062 | A | 10/1994 | Maeda |
| 5,621,794 | A | 4/1997 | Matsuda et al. ............... 380/20 |
| 5,621,799 | A | 4/1997 | Katta et al. .................... 380/48 |
| 5,761,223 | A | 6/1998 | Ando et al. ................... 348/588 |
| 5,805,700 | A | 9/1998 | Nardone et al. .............. 380/10 |
| 5,926,209 | A * | 7/1999 | Glatt ........................... 348/143 |
| 6,385,772 | B1 * | 5/2002 | Courtney .................... 725/105 |
| 6,414,716 | B1 * | 7/2002 | Kawai ....................... 348/211.3 |
| 6,456,335 | B1 * | 9/2002 | Miura et al. ................ 348/588 |

FOREIGN PATENT DOCUMENTS

| EP | 0 763 936 A2 | 3/1997 |
| EP | 0 860 999 A1 | 8/1998 |
| EP | 0 969 668 A2 | 1/2000 |
| EP | 0 794 487 A3 | 8/2000 |
| JP | 08-088618 | 4/1996 |
| JP | 08-149462 | 6/1996 |
| JP | 09-116596 | 5/1997 |
| WO | WO 99/48296 | 9/1999 |

OTHER PUBLICATIONS

"N2323—MPEG-4 Overview—(Diblin version)" International Organization for Standardization—Organisation Internationale De Nomalisation, PPS. 1-55, Jul. 1998.
"MPEG-4 IPR Protection Requirements Specifications" Hill, et al., Acts Project AC302—Mirador, pps. 1-50, Jul. 1998.

* cited by examiner

Primary Examiner—Andy Rao
(74) Attorney, Agent, or Firm—Fitzpatrick, Cella, Harper & Scinto

(57) ABSTRACT

Disclosed are an image processing apparatus and a method therefor, which are characterized by the input of image data, the generation of security data to protect said image data, the control of an encoding mode in accordance with said security data, and the encoding of said image data using said encoding mode that is controlled; and a storage medium on which an image processing program is stored.

25 Claims, 24 Drawing Sheets

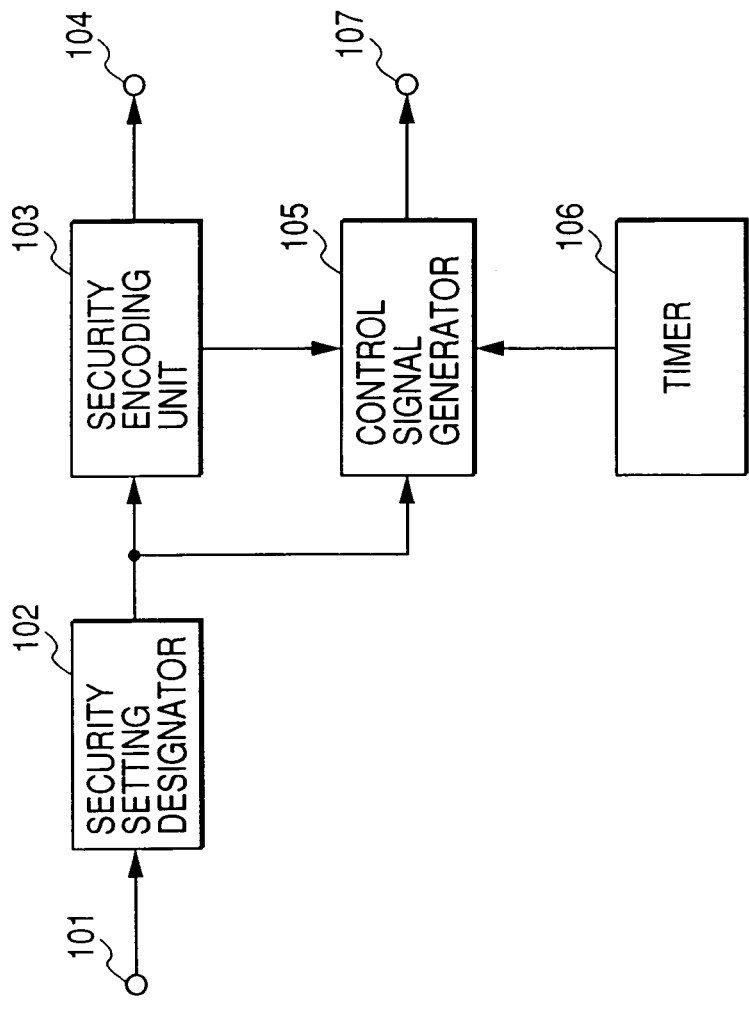

FIG. 10

| CodeLength | A/V | IPcode | SecurityStartTime | SecurityEndTime | ... |
|---|---|---|---|---|---|
| 2001 | 2005 2002 | | 2003 | 2004 | |

FIG. 11

| CodeLength | Objectcode | IPcode | SecurityStartTime | SecurityEndTime | Objectcode | IPcode | SecurityStartTime | SecurityEndTime | ... |
|---|---|---|---|---|---|---|---|---|---|
| 2001 | 2006 | 2002 | | 2003 | 2004 | | | | |

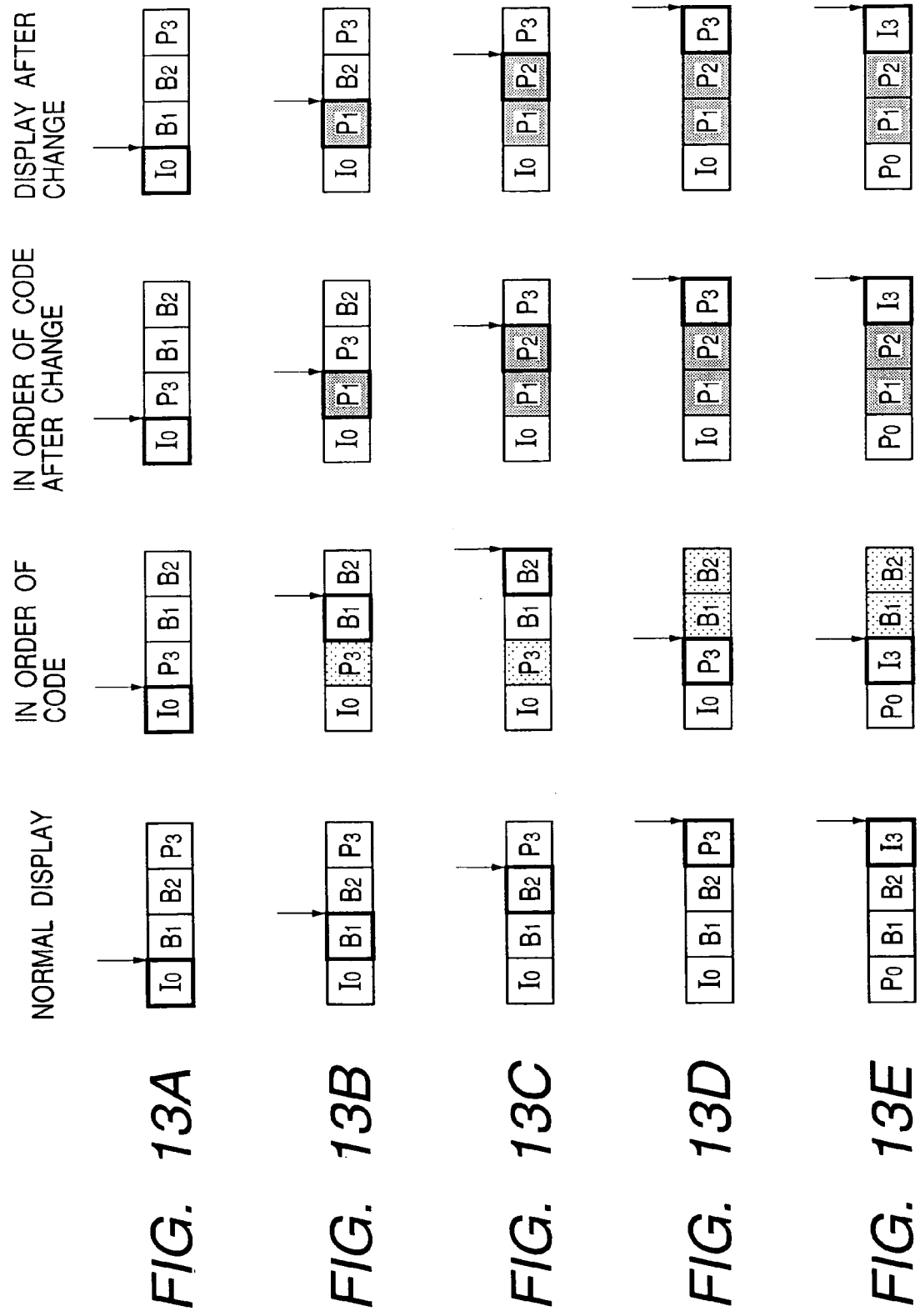

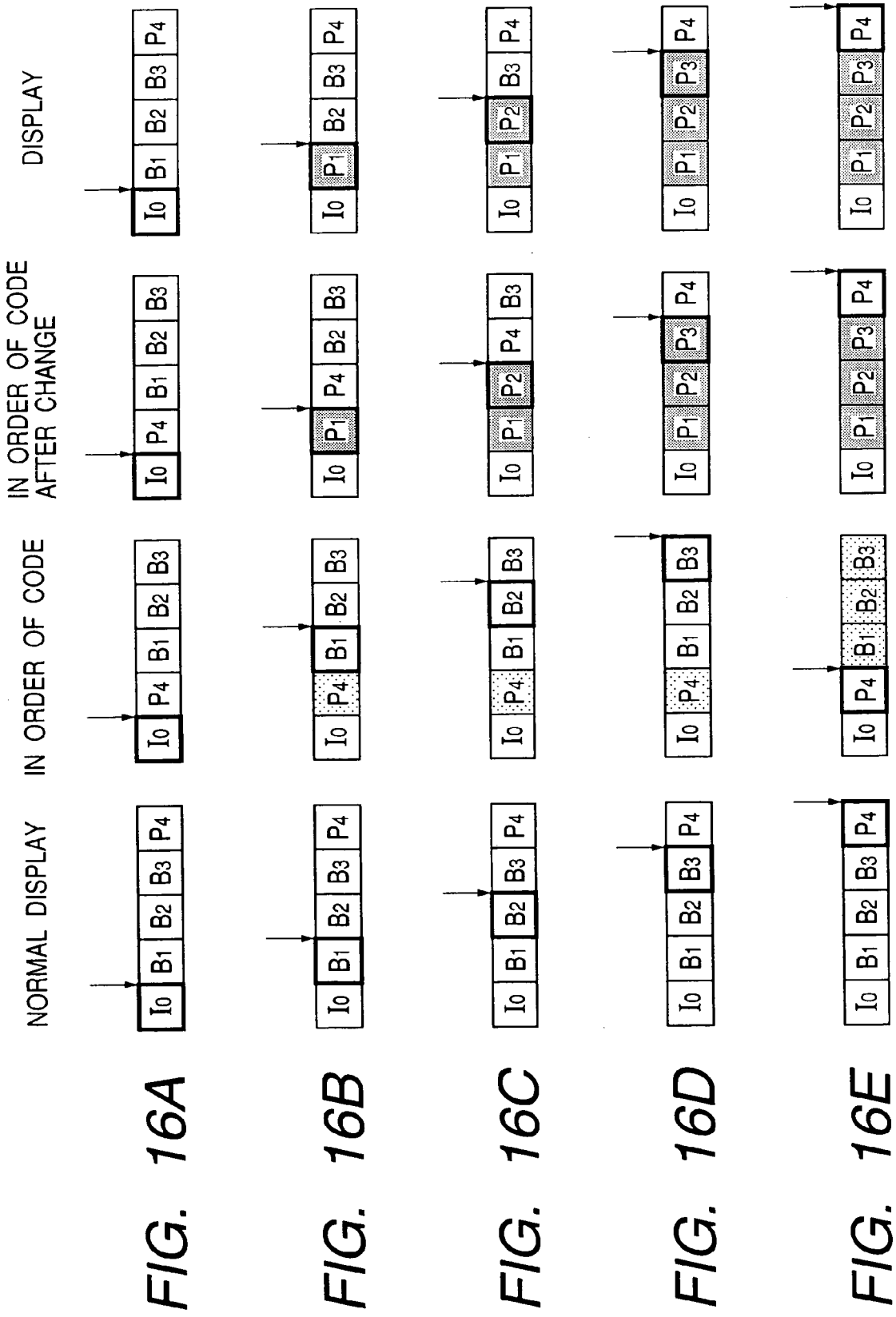

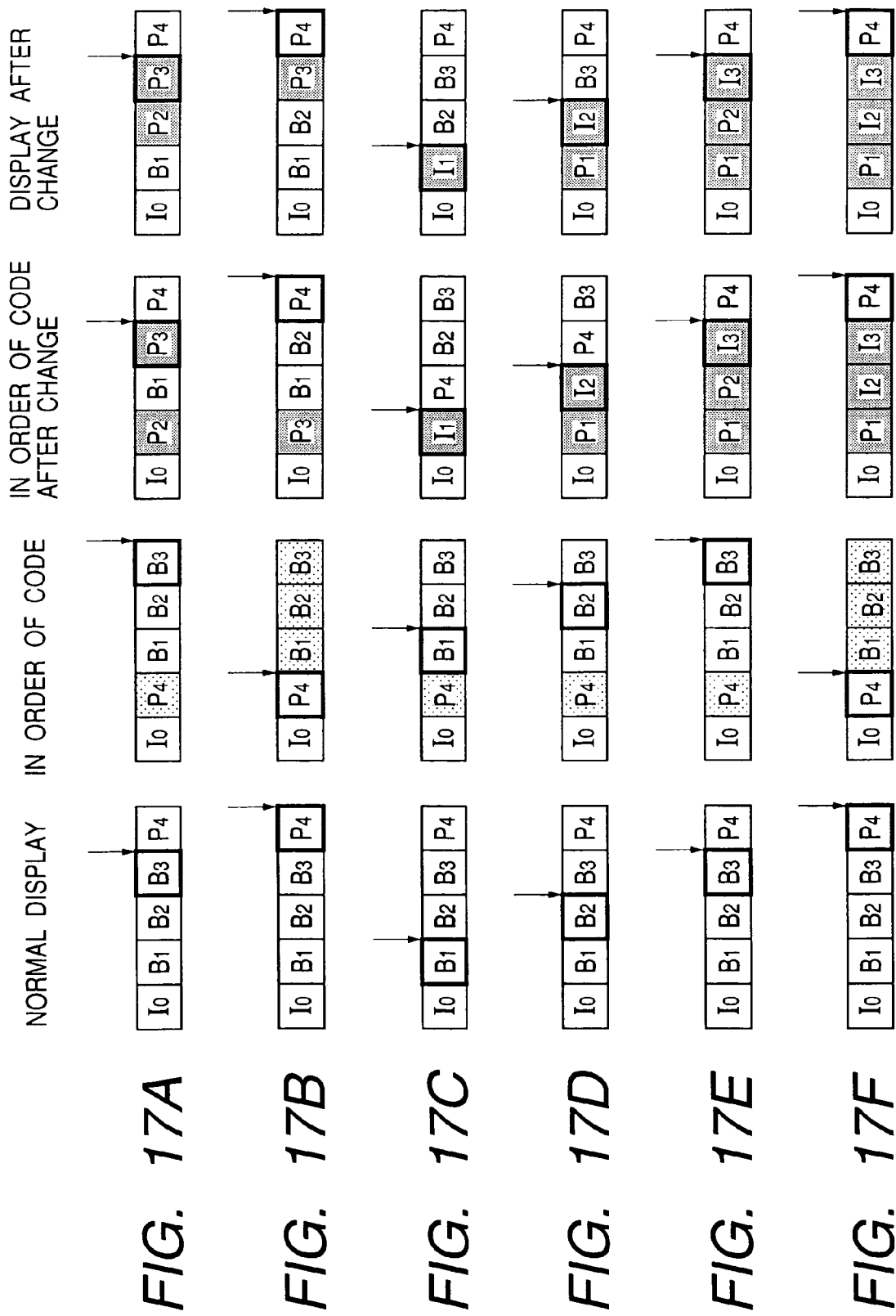

IMAGE PROCESSING APPARATUS AND METHOD, AND STORAGE MEDIUM STORING IMAGE PROCESSING PROGRAM

BACKGROUND OF THE INVENTION

1. Field of the Invention

The present invention relates to image processing performed to protect a copyright for an image, and the like.

2. Related Background Art

Recently, the standardization of motion image encoding techniques has been advanced rapidly. And encoding standards, such as MPEG-1, MPEG-2, H.261 and H.263 (these encoding systems are specifically accepted as international standards by ISO (International Organization for Standardization) and ITU (International Telecommunication Union)), have now been established. Further, work is progressing on MPEG-4, a new international standard that is intended to be a general-purpose, next-generation multimedia encoding standard that can be used in many fields, such as computers, broadcasting and communication. Image digitization has also been advanced by the encoding technique, and the storage and communication of motion image data have been markedly improved.

For example, with MPEG-4, a motion image scene at a specific moment is regarded as an aggregate of objects, such as a "person", a "car", a "background", "music" and "video", which are the components of the scene, and an appropriate encoding process is performed for each object to efficiently encode all the motion image data.

According to a multi-object encoding technique such as MPEG-4, a frame for a scene is expressed by combining individual objects that have been encoded and compressed. Therefore, object data obtained from specific MPEG-4 data can be re-used with different MPEG-4 data, so that another frame can be easily expressed.

As the above described digital encoding standards have spread, the contents business has strongly expressed the problem they represent for the provision of copyright protection. That is, if the standards do not satisfactorily ensure adequate copyright protection, safe and superior contents can not be provided.

For MPEG-4 this is a very serious problem. This is so because, as is described above, with MPEG-4 it is possible to encode and to operate/process data for individual objects. Therefore, since the use of the multi-object encoding system MPEG-4 permits the seamless reuse of individual objects, it is natural for requests to be made that protection be provided for the intellectual property represented by an object. And if the target is a person, it is natural that protection be sought for the right of portrait.

To protect a copyright for a portion of a motion image, a method is available for temporarily halting the decoding of the motion image to prevent the reproduction of a part of it. According to this method, while taking into account the right of portrait and the copyright for the motion image, the decoding of a portion related to them is halted until that portion has been passed, at which time the decoding is resumed.

With this method, however, the following problem is encountered.

The encoding system for using interframe correlation is generally employed to encode motion images. In the previously mentioned, well-known encoding systems H.261 and H.263, and MPEG-1, 2 and 4, basically, the preceding frame, or both the preceding and the succeeding frames, are referred to along the time axis, and motion compensation is performed to encode motion images.

Data reproduction provided by H.261 or H.263 is shown in FIG. 1. $I_*$ denotes a frame for intraframe encoding, and $P_*$ denotes a frame for interframe encoding. In FIG. 1, Time is the direction in which time elapses, and in Security, a period during which the decoding process is halted is represented as a black block. Code represents the arrangement of screens in the order in which encoded, and Display represents the arrangement of screens in the order in which displayed.

Suppose that the decoding of the encoded data for frames $P_4$ to $P_9$ is halted to apply the protection (Security) provided for an intellectual property (e.g., a copyright). The decoding of motion images is halted at data $P_3$, and images are not again displayed until the decoding is resumed. Since the writing of encoded data to a buffer is also halted at the same time, the encoded data from $P_4$ to $P_9$ are abandoned. Therefore, when the image protection time has ended and the decoding is resumed, data $P_9$, which originally should have been referred to by data $P_{10}$, have already been abandoned, so that data $P_{10}$ and the following data can not be normally decoded. As a result, until frame $I_1$, for which intraframe encoding is performed, is decoded, in an interval extending from $P_{10}$ to $P_{13}$, the images in the frames are deteriorated, or the decoding process is halted.

MPEG-1, 2, and 4 also employ bidirectional motion compensation, whereby motion along the time axis is predicted from preceding and succeeding frames.

The data reproduction provided by MPEG-1, 2, and 4 is shown in FIG. 2. $B_*$ denotes frames for bidirectional (two-way) interframe encoding. In FIG. 2, Time is the direction in which time elapses, and in Security, a period during which the decoding process is halted is represented as a black block. Code represents the arrangement of screens in the order in which encoding is performed, and Display represents the arrangement of screens in the order in which of displayed. For the frames B, the order in which pictures are encoded differs from the order for the original pictures.

Suppose that the decoding for encoded data from $B_{10}$ to $P_3$ is halted to protect an intellectual property (e.g., a copyright). Since motion compensation is not correctly performed, as in FIG. 1, the images in frames $B_{30}$ and $B_{31}$, or $B_{40}$ and $B_{41}$, are not correctly decoded, and the images in the frames are deteriorated, or the decoding process is halted.

SUMMARY OF THE INVENTION

To resolve the above problem, it is one object of the present invention to provide an image processing apparatus and an image processing method for satisfactorily reproducing images or for halting the reproduction of images to begin the application of the protection (e.g., the copyright) provided for the intellectual property represented by the images, and to provide a storage medium on which an image processing program is stored.

To achieve the above object, according to one aspect of the present invention, an image processing apparatus/method is characterized by the entering of image data, the generation of security data to protect the image data, the control of an encoding mode in accordance with the security data, and the encoding of the image data using the controlled encoding mode.

According to another aspect of the present invention, provided is a storage medium on which an image processing program is stored, the image processing program comprising:

sequence codes for an entry step for the entry of image data;

sequence codes for a generation step for the generation of security data to protect the image data;

sequence codes for an encoding step for the control of an encoding mode in accordance with the security data; and sequence codes for a control step for the encoding of the image data using the controlled encoding mode.

Other objects, features and advantages of the invention will become apparent during the course of the following detailed description, which is given while referring to the accompanying drawings.

BRIEF DESCRIPTION OF THE DRAWINGS

FIG. 4 is a block diagram illustrating the arrangement of a security encoding unit according to the first embodiment of the present invention;

FIG. 5 is a diagram for explaining security encoded data according to the first embodiment of the present invention;

FIG. 10 is a diagram for explaining the security provided for encoded data that correspond to a voice and a motion image according to the present invention;

FIG. 11 is a diagram for explaining the security that is provided for encoded data that correspond to a MPEG-4 multi-object according to the present invention;

FIGS. 13A, 13B, 13C, 13D and 13E are diagrams for explaining the change from an encoding mode for permitting security information to an encoding mode for prohibiting security information according to the second embodiment of the present invention;

FIGS. 16A, 16B, 16C, 16D and 16E are diagrams for explaining the change from security information permitting an encoding mode to security information prohibiting an encoding mode according to the second embodiment of the present invention;

FIGS. 17A, 17B, 17C, 17D, 17E and 17F are diagrams for explaining the change from security information permitting an encoding mode to security information prohibiting an encoding mode according to the second embodiment of the present invention;

DETAILED DESCRIPTION OF THE PREFERRED EMBODIMENTS

A first embodiment of the present invention will now be described in detail while referring to the accompanying drawings.

Figure 3:
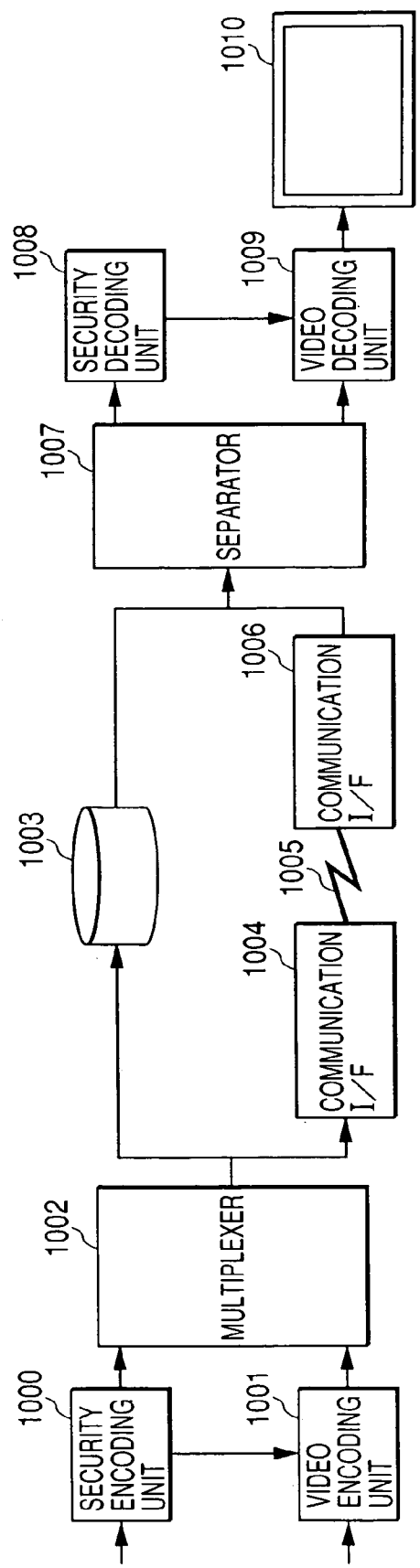
FIG. 3 is a block diagram illustrating the arrangement of an image processing apparatus according to a first embodiment of the present invention.

FIG. 3 is a block diagram illustrating the arrangement of an image processing apparatus according to the first embodiment of the present invention.

In FIG. 3, a security encoding unit 1000 encodes security information used for permitting or prohibiting production of all or one part of motion images. A video encoding unit 1001 encodes motion image data.

In this embodiment, an explanation will be given for the encoding of motion image data using the MPEG-1 encoding system. The MPEG-1 encoding system itself will not be explained since all the details concerning its operation are given in ISO/IEC11172-2. Further, to simplify the explanation, it is herein presumed that motion image data are encoded for each frame, and that a one-frame mode for intraframe encoding and a P-frame mode for employing interframe correlation are employed.

A multiplexer 1002 multiplexes encoded security data and encoded motion image data to obtain motion image data. And a storage device 1003 stores the multiplexed motion image data.

A communication circuit 1005 is constituted by a LAN, a public line network, a radio network or broadcast radio waves. Communication interfaces 1004 and 1006 exchange motion data with the communication circuit 1005.

A separator 1007 divides the motion image data into encoded security data and encoded motion image data. A security decoding unit 1008 decodes the encoded security data, and compares the decoded data with certification data to determine whether to instruct a halt or the resumption of the reproduction of a motion image. A video decoding unit 1009 decodes the encoded motion image data, and reproduces a motion image. A monitor 1010 displays the reproduced motion image.

The processing for the motion image data performed by the thus arranged apparatus will be now explained.

An operator (not shown) enters motion image data that are transmitted to the video encoding unit 1001, and also enters, for the security encoding unit 1000, the time to begin the application of the protection provided for intellectual property (a copyright in this embodiment) and the time to end the protection provided for the copyright, as well as security information concerning an unlocking key for unlocking the security.

The security encoding unit 1000 will now be described in detail.

FIG. 4 is a detailed block diagram of the security encoding unit 1000.

In FIG. 4, security information is entered at an input terminal 101. Thereafter, a security setting designator 102 employs the security information to determine for which frame decoding is prohibited. A security encoding unit 103 then encodes the security information and it is output at an output terminal 104. Based on the output of the security setting designator 102, a control signal generator 105 generates a control signal to control the video encoding unit 1001. A timer 106 is used to synchronize the timing for the entire system, and a control signal is output at an output terminal 107.

The encoding processing performed by the thus arranged security encoding unit 1000 will now be described.

The security setting designator 102 rearranges received security information following the order of the times at which the decoding prohibited commands appear, and stores the newly arranged information. The security encoding unit 103 then encodes the security information, and outputs the encoded data to the multiplexer 1002 via the output terminal 104.

The encoded security data will now be described in detail.

FIG. 5 is a diagram showing the structure of the encoded security data.

A CodeLength code 2001 represents the code length; an IPcode code 2002 represents the information required for the certification of an intellectual property (a copyright in this embodiment); a SecurityStartTime code 2003 represents the time to begin applying the protection provided by the copyright; and a SecurityEndTime code 2004 represents the time to end the application of the protection provided by the copyright. It should be noted that a plurality of code 2002 to 2004 combinations are employed if a motion image for which security is desired is divided into a plurality of segments.

In this embodiment, the encoded security data are multiplexed at the head of the motion image data by the multiplexer 1002. However, the employment of the multiplexing process is not thereby limited, and the encoded security data may be multiplexed with motion image data in a time sharing manner and the resultant data transmitted.

Referring to FIG. 4, the security setting designator 102 transmits, to the control signal generator 105, the time to begin to applying the protection provided by the copyright, and the time to end that application. The control signal generator 105 compares the received times with the time indicated by the timer 106, generates a signal for controlling the application of the protection provided by the copyright, and outputs it to the video encoding unit 1001 via the output terminal 107.

The video encoding unit 1001 will now be described in detail.

Figure 6:
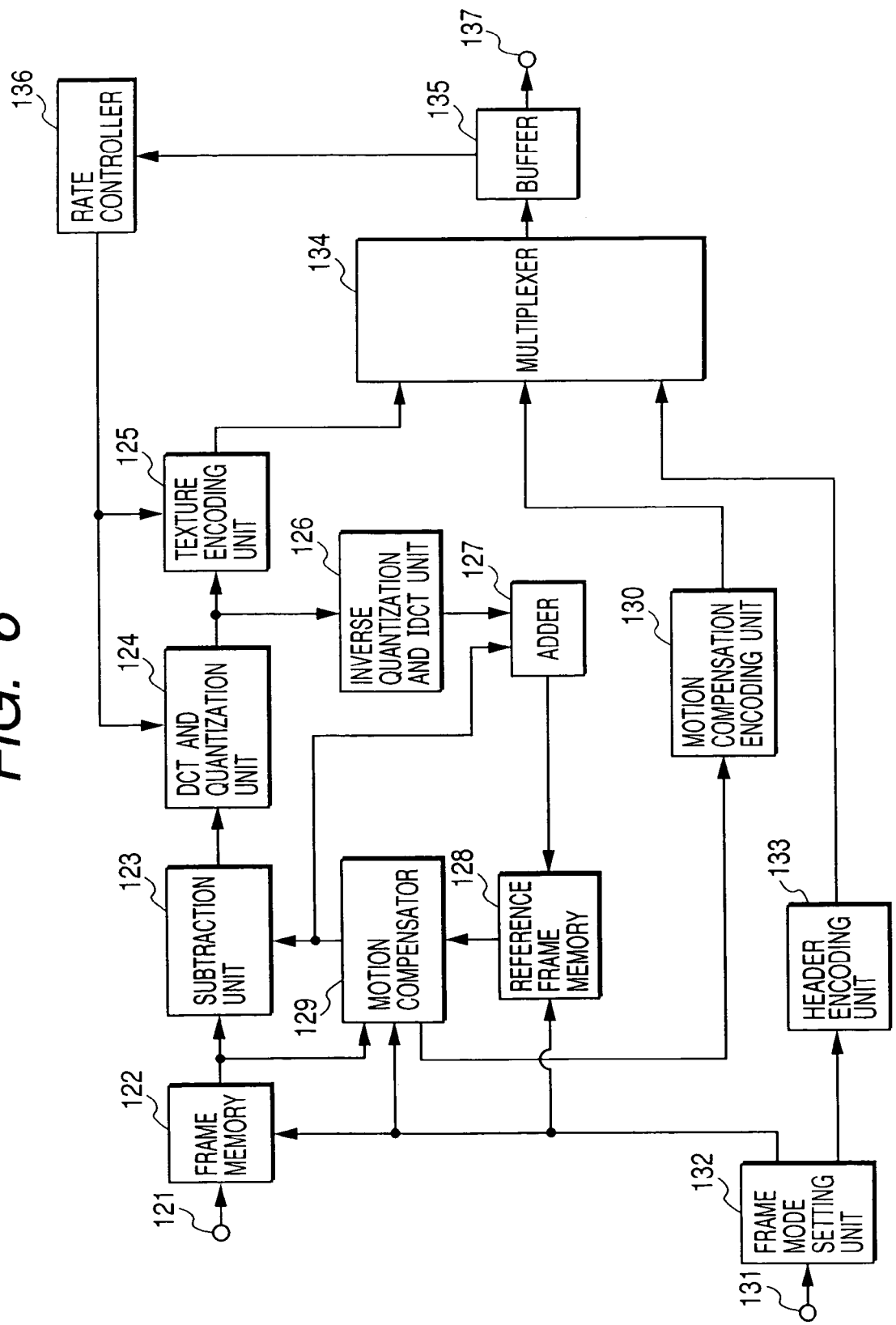
FIG. 6 is a block diagram illustrating the arrangement of a video encoding unit according to the first embodiment of the present invention.

FIG. 6 is a detailed block diagram of the video encoding unit 1001.

In FIG. 6, image data are entered at an input terminal 121, and a frame memory 122 is used to store an image for each frame. A subtraction unit 123 calculates value differences for the pixels in each macro block. A DCT and quantization unit 124 performs a DCT transform and quantizes a transform coefficient. Thereafter, a texture encoding unit 125 performs entropy encoding for the results obtained by the quantization.

An inverse quantization and DCT unit 126 receives a quantized transform coefficient, and performs an inverse quantization and an inverse DCT transform. An adder 127 adds the values for the pixels in each macro block, and a reference frame memory 128 is used to store frame images to perform motion compensation. A motion compensation unit 129 calculates a motion vector from data provided by frame memory 122 and the reference frame memory 128, and performs motion compensation. A motion compensation encoding unit 130 generates code that is related to motion compensation, such as an encoding mode for a macro block or a motion vector, which is output by the motion compensation unit 129.

Figure 2:
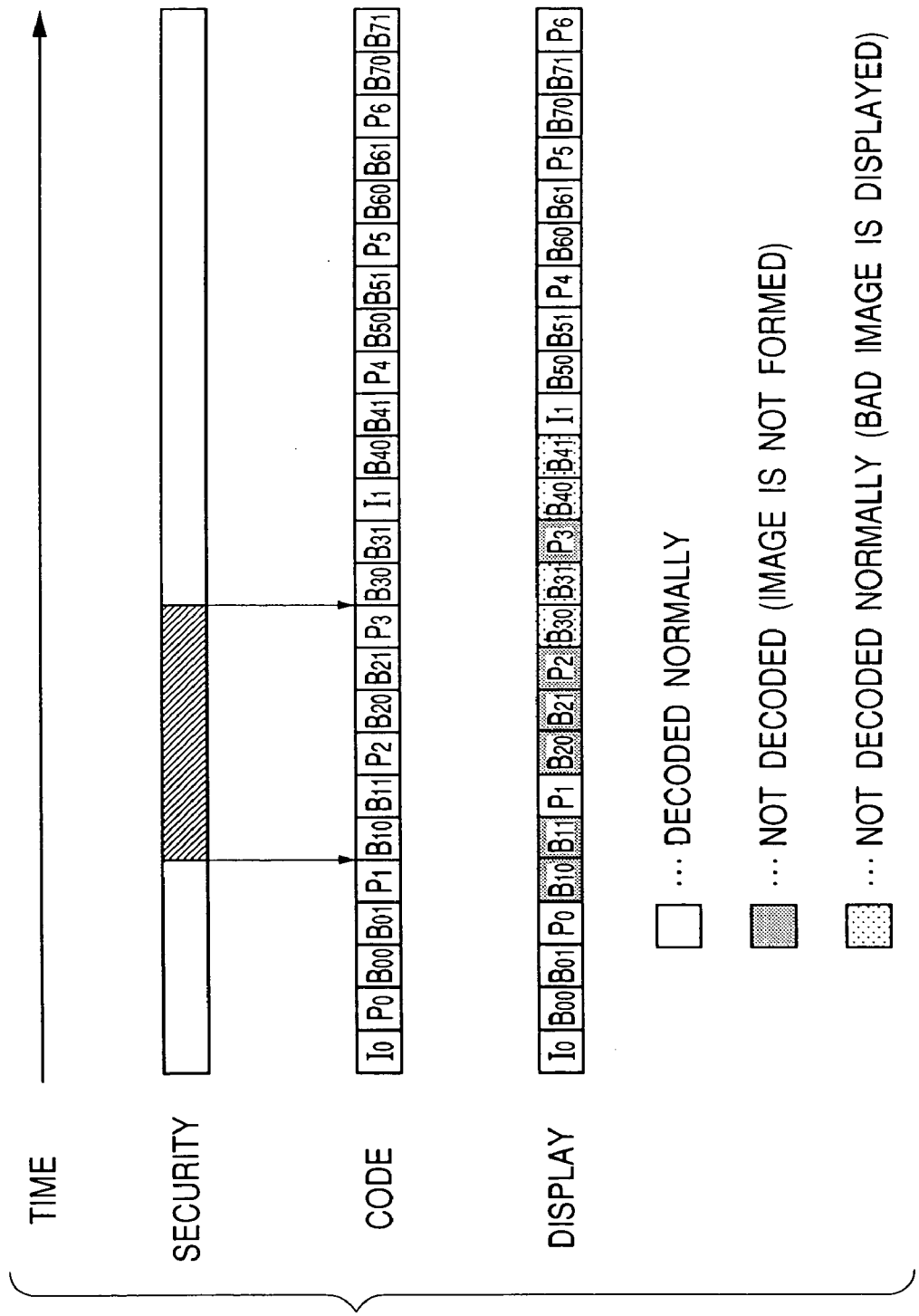
FIG. 2 is a diagram for explaining the conventional decoding process (for data consisting of I, P and B frames) when images are protected.

A control signal from the control signal generator 105 in FIG. 2 is input at a terminal 131. A frame mode setting unit 132 sets a frame mode for encoding, and a header encoding unit 133 encodes a header include a frame mode. A multiplexer 134 multiplexes the data output by the texture encoding unit 125, the motion compensation encoding unit 130 and the header encoding unit 133, and a buffer 135 is used for the temporary storage of the encoded data that are generated by the multiplexer 134.

A rate controller 136 controls the amount of code, and adjusts the quantization coefficient used by the DCT and quantization unit 124, and an output terminal 137 externally outputs the data generated by the multiplexer 134.

The encoding process performed by the thus arranged video encoding unit 1001 will now be explained.

Image data for motion images are sequentially entered at the input terminal 121, and are stored in the frame memory 122. A control signal, which for a frame to be encoded indicates the security information is "permission" or "prohibition", is entered at the input terminal 131.

First, an explanation will be given for a case wherein security measures are not imposed and "permission" is transmitted to the frame mode setting unit 132.

The frame mode setting unit 132 performs the intraframe encoding at constant intervals, and performs interframe encoding for the other frames. In this embodiment, every 15 frames an I frame is encoded in the I frame mode, and the other 14 frames are P frames, which are encoded in the P frame mode.

The frame mode setting unit 132 transmits a control signal to the motion compensation unit 129, the frame memory 122 and the reference frame memory 128, so that in the P frame mode, motion compensation is performed, or so that in the I frame mode, motion compensation is not performed. Further, the frame mode setting unit 132 transmits a determined frame mode to the header encoding unit 133, and the header encoding unit 133 generates encoded data for the header in accordance with to the MPEG-1 specifications.

In the I frame mode, the motion compensation unit 129 outputs a 0 for each macro block (e.g., a block consisting of 16×16 pixels). In the P frame mode, the motion compensation unit 129 refers to the frame memory 122 and the reference frame memory 128 to calculate a motion vector for a macro block to be encoded, and employs bidirectional motion compensation to predict a macro block that is output.

The frame image data stored in the frame memory 122 for each macro block are transmitted to the subtraction unit 123. The subtraction unit 123 performs a subtraction procedure using the pixel values and the value of the macro block output by the motion compensation unit 129. The subtraction result of the subtraction unit 123 is output to the DCT and to the quantization unit 124, which performs a DCT transform for the result. The DCT and the quantization unit 124 then use the quantization coefficient to quantize the obtained value.

The result obtained by the DCT and the quantization unit 124 is transmitted to the texture encoding unit 125. According to the MPEG-1 encoding specifications, the texture encoding unit 125 encodes the encoding mode of the macro block, the quantization coefficient and the quantization result (entropy coding (variable length coding) based on Huffmann coding), and outputs the obtained data to the multiplexer 134.

The data output by the DCT and the quantization unit 124 are transmitted to the inverse quantization and IDCT unit 126, which then performs an inverse DCT transform to obtain pixel data, or error data due to motion compensation. The adder 127 then adds the error data to the result obtained by the motion compensation unit 129.

The pixel value obtained by the adder 127 is stored in the reference frame memory 128, and the motion vector obtained by the motion compensation unit 129 is transmitted to the motion compensation encoding unit 130. The motion compensation encoding unit 130 encodes the motion vector and outputs the encoded motion vector to the multiplexer 134.

According to MPEG-1, the multiplexer 134 multiplexes the outputs of the texture encoding unit 125, the motion compensation encoding unit 130 and the header encoding unit 133, and outputs the result to the buffer 135. The encoded data stored in the buffer 135 are output via the output terminal 137. In addition, the rate controller 136 monitors the amount of code stored in the buffer 135, and controls the amount of code that is generated by changing the quantization coefficient of the DCT and the quantization unit 124.

An explanation will now be given for a case wherein security is imposed and the security information is changed from permission to prohibition.

At this time, the frame mode setting unit 132 does not begin any particular operation, and normally sets a mode in accordance with the cycle of the I frame mode and P frame mode. Therefore, the other units perform their operations in the same manner as they do when the security information denotes permission.

An explanation will now be given for a case wherein the security is unlocked and the security information is changed from prohibition to permission.

The frame mode setting unit 132 designates, as the I frame mode, the frame mode of the first frame that is unlocked. Therefore, the header encoding unit 133 outputs encoded data indicating that the frame to be encoded has an I frame mode. Since the motion compensation unit 129 is not activated, motion compensation is not performed. For the frames following the I frame, the frame mode is set in accordance with the cycle for I frames and P frames that is set in advance.

The encoded data for a motion image output by the output terminal 137 are multiplexed with the encoded security data by the multiplexer 1002.

The multiplexed motion image data are stored in the storage unit 1003, or are transmitted via the communication interface 1004 to the communication circuit 1005.

The processing for decoding the thus obtained motion image data will now be described in detail.

The motion image data generated above are received from the storage unit 1003 or from the communication interface 1006. The separator 1007 separates the input motion image data into encoded motion image data and encoded security data. The encoded motion image data are transmitted to the video decoding unit 1009, and the encoded security data are transmitted to the security decoding unit 1004.

The security decoding unit 1008 will now be described in detail.

Figure 7:
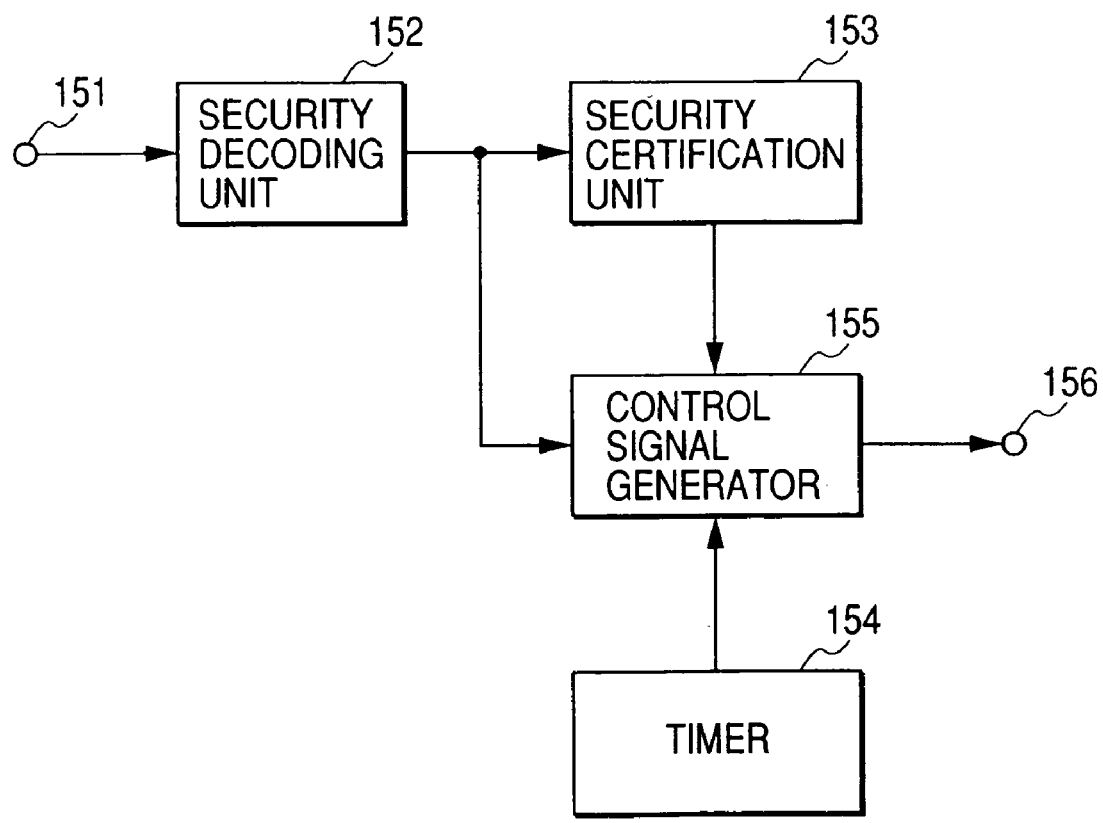
FIG. 7 is a block diagram illustrating the arrangement of a security decoding unit according to the first embodiment of the present invention.

FIG. 7 is a detailed block diagram for the security decoding unit 1008.

In FIG. 7, encoded security data is input at an input terminal 151, and is decoded by a security decoding unit 152 to obtain certification information and information concerning the time the protection provided for a copyright is to be applied. A security certification unit 153 analyzes the certification information, and determines whether decoding should be performed or should be prohibited. A timer 154 generates a time at which to correctly reproduce a motion image. A control signal generator 155 employs the result of the determination made by the security certification unit 153 to generate a signal for controlling the video decoding unit 1009. An output terminal 156 is used to transmit, to the video decoding unit 1005, a control signal generated by the control signal generator 155.

The decoding process performed by the thus arranged security decoding unit 1008 will now be described.

The encoded security data input at the input terminal 151 are decoded by the security decoding unit 152. Of the codes shown in FIG. 5, the CodeLength code 2001 is decoded to determine the overall amount of encoded data, and the IPcode code 2002, the SecurityStartTime code 2003 and the SecurityEndTime code 2004 are decoded to obtain infomation for each portion for which security is imposed.

The information required for certification is transmitted to the security certification unit 153, and if no instruction is thereafter issued by the security certification unit 153, the control signal generator 155 outputs a control signal to the video decoding unit 1009 via the output terminal 156, so that the video decoding unit 1009 will decode the encoded motion image data.

The security certification unit 153 compares certification information that is entered at an operating console (not shown) by an operator with the certification information decoded by the security decoding unit 152, and determines whether decoding should be permitted.

If the security certification unit 153 determines that decoding should be permitted, it notifies the control signal generator 155 of decoding is permitted. At this time, if the control signal generator 155 has already generated a control signal to permit the video decoding unit 1009 to decode motion image data, this control signal is not changed.

If the security certification unit 153 determines that decoding should be prohibited, it outputs to the control signal generator 155 a signal prohibiting decoding. The control signal generator 155 then compares the time output by the timer 154 with the information that is output by the security decoding unit 152 and determines the time at which to start to apply the protection provided by the pertinent copyright. When the time to apply the copyright protection matches the time output by the timer 154, a signal to halt the decoding of motion image data is output via the output terminal 156. In addition, the control signal generator 155 compares the information specifying the time the copyright protection is to end with the time received from the timer 154. When the two times match, a signal to resume the decoding of motion image data is output via the output terminal 156.

Thus, the video decoding unit 1009 decodes the encoded motion image data based on the control signal received from the security decoding unit 1008.

The video decoding unit 1009 will now be described in detail.

Figure 8:
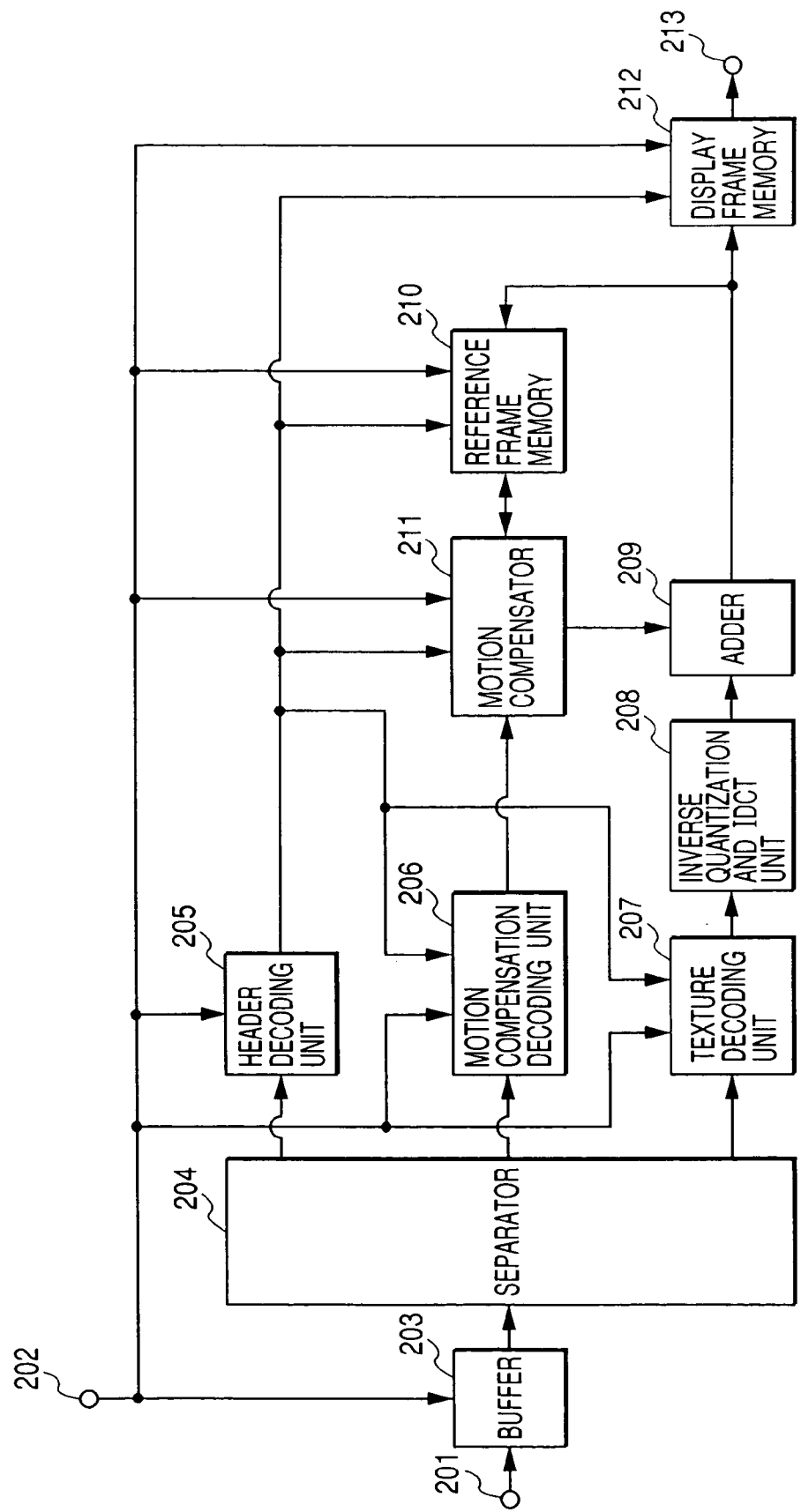
FIG. 8 is a block diagram illustrating the arrangement of a video decoding unit according to the first embodiment of the present invention.

FIG. 8 is a detailed block diagram for the video decoding unit 1009.

In FIG. 8, encoded motion image data is input at an image data input terminal 201; a control signal from the security decoding unit 1008 is input at a control signal input terminal 202; and the encoded motion image data is stored in a buffer 203.

A separator 204 reads the MPEG-1 encoded data from the buffer 203, and divides these data into header information representing the contents of code, motion compensation code for performing motion compensation, and data obtained by encoding a DCT transform coefficient.

A header decoding unit 205, which decodes the header information provided by the separator 204, obtains information by decoding various start codes, the size of an image and the encoding modes of individual frames.

A motion compensation decoding unit 206 decodes the motion compensation code, the encoding modes and the motion vectors for individual macro blocks, and obtains information that is required for motion compensation. A texture decoding unit 207 decodes codes to acquire the quantized data for the quantization coefficient, and the DCT transform coefficient.

An inverse quantization and IDCT unit 208 receives the quantized data for the quantization coefficient and the DCT transform coefficient, performs an inverse quantization and an inverse transform for the received data, and obtains pixel data, or motion compensation error data.

An adder 209 adds the results obtained by the motion compensation to the error data. A reference frame memory 210 is used to store a reference frame required for motion compensation. A motion compensation unit 211 performs motion compensation for the contents of the reference frame memory 210 in accordance with the results obtained by the motion vector decoding unit 206.

A display frame memory 212 is used to temporarily store motion image data for the decoded frames before they are output. An output terminal 213 is used to output the motion image data to the monitor 1010.

The decoding process performed by the thus arranged video decoding unit 1009 will now be descried.

First, when a control signal received at the control signal input terminal 202 indicates that decoding is enabled, the encoded motion image data that are received at the image data input terminal 201 are stored in the buffer 203. When a control signal received at the control signal input terminal 202 indicates that decoding is prohibited, the encoded motion image data are not stored in the buffer 203 and are abandoned.

The decoding process performed when the control signal indicates decoding is permitted will be described first.

The separator 204 receives the encoded data from the buffer 203, and divides the encoded data into header information representing the contents of code, motion compensation code for performing motion compensation, and data obtained by encoding a DCT transform coefficient. The header decoding unit 205 decodes various start codes, the size of an image, and encoding modes for the individual frames to acquire information.

The motion compensation decoding unit 206 decodes the motion compensation code obtained by the separator 204, and the encoding modes and motion vectors for the individual macro blocks, and obtains information that is required for motion compensation. For a P frame, the motion compensation decoding unit 206 transmits the obtained information to the motion compensation unit 211 for the motion compensation operation.

The texture decoding unit 207 decodes the encoded data obtained by the separator 204, and acquires the quantized data for the quantization coefficient and the DCT transform coefficient. The quantized data that are decoded are transmitted to the inverse quantization and IDCT unit 208, which then obtains pixel data, or error data due to motion compensation.

The adder 209 adds the error data to the data output by the motion compensation unit 211. If the encoding mode for a macro block decoded by the motion compensation decoding unit 206 is intraframe coding, the motion compensation unit 211 outputs a value of 0 to the adder 209. Otherwise, the motion compensation unit 211, in accordance with the obtained motion vector, performs motion compensation using a reference frame in the reference frame memory 210, and outputs the reference macro block data to the adder 209.

The pixel value obtained by the adder 209 is stored in the reference frame memory 210 and the display frame memory 212. And the image data stored in the display frame memory 213 are output via the output terminal 213 to the monitor 1010 to display thereon.

An explanation will now be given for the decoding process performed when the control signal changes an instruction from permission to decode to decoding prohibited to instruct resuming of decoding.

The entry of code in the buffer 203 is halted, and the operations of the header decoding unit 205, the motion compensation decoding unit 206, the motion compensation unit 211 and the texture decoding unit 207 are also halted.

Furthermore, the updating of the reference frame memory 210 and the display frame memory 212 is prohibited, and as a result, the image data for the last frame that was decoded are output via the output terminal 212. Therefore, the last frame for which decoding was permitted is continuously displayed on the monitor 1010.

An explanation will now be given for the decoding process performed when the instruction for the control signal is changed from decoding prohibited to decoding permitted, and the resumption of decoding is instructed.

The entry of code in the buffer 203 is resumed, and the header decoding unit 205 is activated. Since the first frame is an I frame, the operation of the texture decoding unit 207 is resumed, and the updating of the reference frame memory 210 and the display frame memory 212 is restarted. The operations of the individual units are continued to decode the I frames and the P frames until the control signal again indicates decoding is prohibited. Thus, the display on the monitor 1010 is updated, and the display of motion images is resumed.

Since the decoding is resumed through the above described selective process sequence and the intraframe encoding is performed for the first frame, the deterioration of the frame images, or the interruption of the decoding process can be easily prevented.

Figure 9:
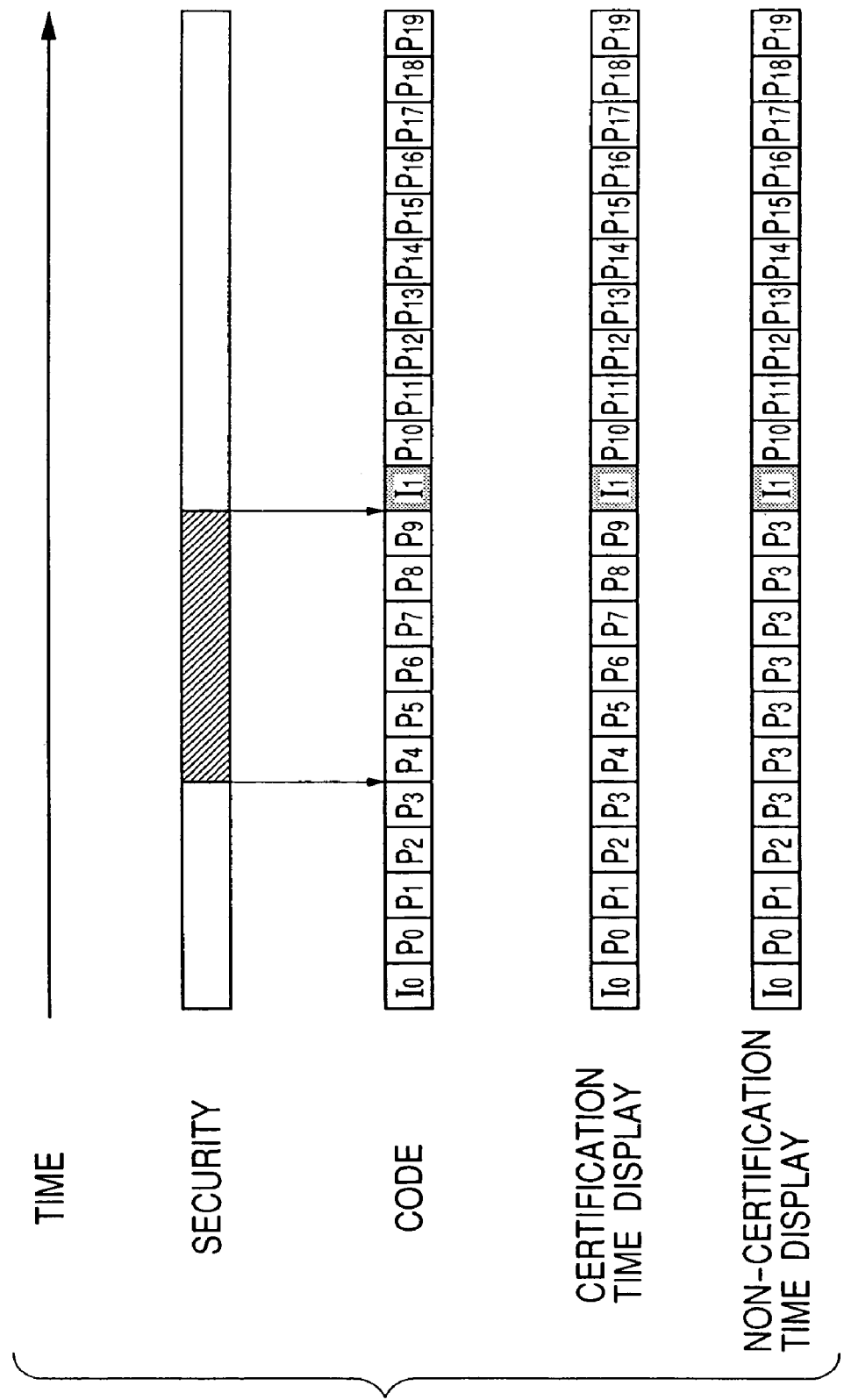
FIG. 9 is a diagram for explaining the decoding process according to the first embodiment of the present invention.

Suppose that, as is shown in FIG. 9, the protection (Security) provided for a copyright is applied in an interval between encoded frames $P_4$ and $P_9$, and that the frames can not be certified. In this case, since the frame $P_3$ located immediately before the point at which Security was applied is continuously displayed, and since the frame located immediately after the Security was unlocked is always an I frame, correct decoding can be performed beginning with the frame immediately following the unlocking of the Security, and the discontinuity of images or the deterioration of images can be prevented. In addition, there is no delay (scene skipping) from the time the Security was unlocked until the image recovery was effected, and a normal image can be provided for a user.

In this embodiment, the image decoded immediately before decoding prohibition is imposed is output during the period in which the decoding is prohibited. However, a predetermined image may be stored in memory in advance, and may be output during the above period.

The memory structures can be changed as needed in this embodiment. The encoding system for motion images is not limited to the MPEG-1 coding system; the MPEG-2 coding system can also be employed with a frame being used as a field, and the H.261 or the H.263 coding system can be employed as well.

The format for the encoded security data, the certification method and the method for designating a portion to receive copyright protection are not limited to those described in the embodiment, and another format, another certification method and another designation method may be employed. For example, as is shown in FIG. 10, in addition to the individual codes in FIG. 5, an A/V flag 2005 may be added to signal whether a copyright to be protected is for a voice or for a motion image.

To apply this embodiment for the MPEG-4 multi-object, an Objectcode code 2006 is added to identify an object, as is shown in FIG. 11, and the security is set up and encoded for each object. A plurality of video encoding units are prepared, and I-VOP is employed to encode the first VOP whereat the security for each object is unlocked, so that the security of the decoding is ensured and the deterioration of image quality can be prevented.

In addition, at the first portion whereat the security is unlocked, a Group of Pictures header may be provided for MPEG-1,2, or a Group of VOPs header may be provided for MPEG-4.

Figure 1:
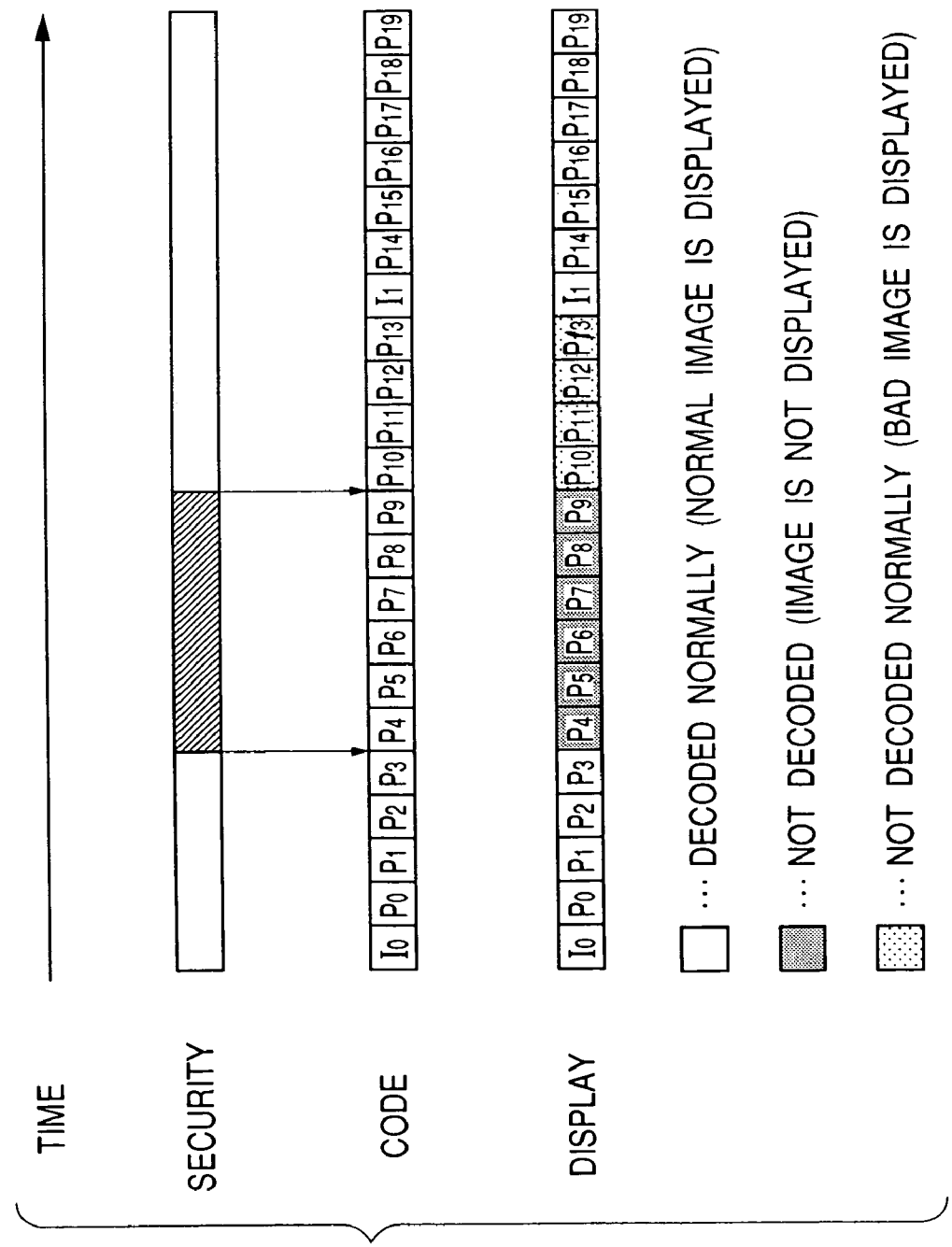
FIG. 1 is a diagram for explaining the conventional decoding process (for data consisting of I and P frames) when images are protected.

The arrangement of an image processing apparatus according to a second embodiment is the same as that in FIG. 1, and only the internal arrangement and the processing for a video encoding unit 1001 differ. Therefore, only the structure and the operation of the video encoding unit 1001 will be explained for the second embodiment.

An explanation will be given for a case in which motion image data is encoded by the MPEG-1 encoding system. Since the MPEG-1 encoding system is described in detail in ISO/IEC11172-2, no explanation for it will be given here. And to simplify the description, data are encoded for each frame, and the encoding modes consist of I frame modes for intraframe coding, P frame modes for employing interframe correlation, along a time axis, to predict a motion image from a preceding frame. And a B frame mode for predicting a motion image, along a time axis, from preceding and succeeding frames.

The video encoding unit 1001 in the second embodiment will now be described in detail.

Figure 12:
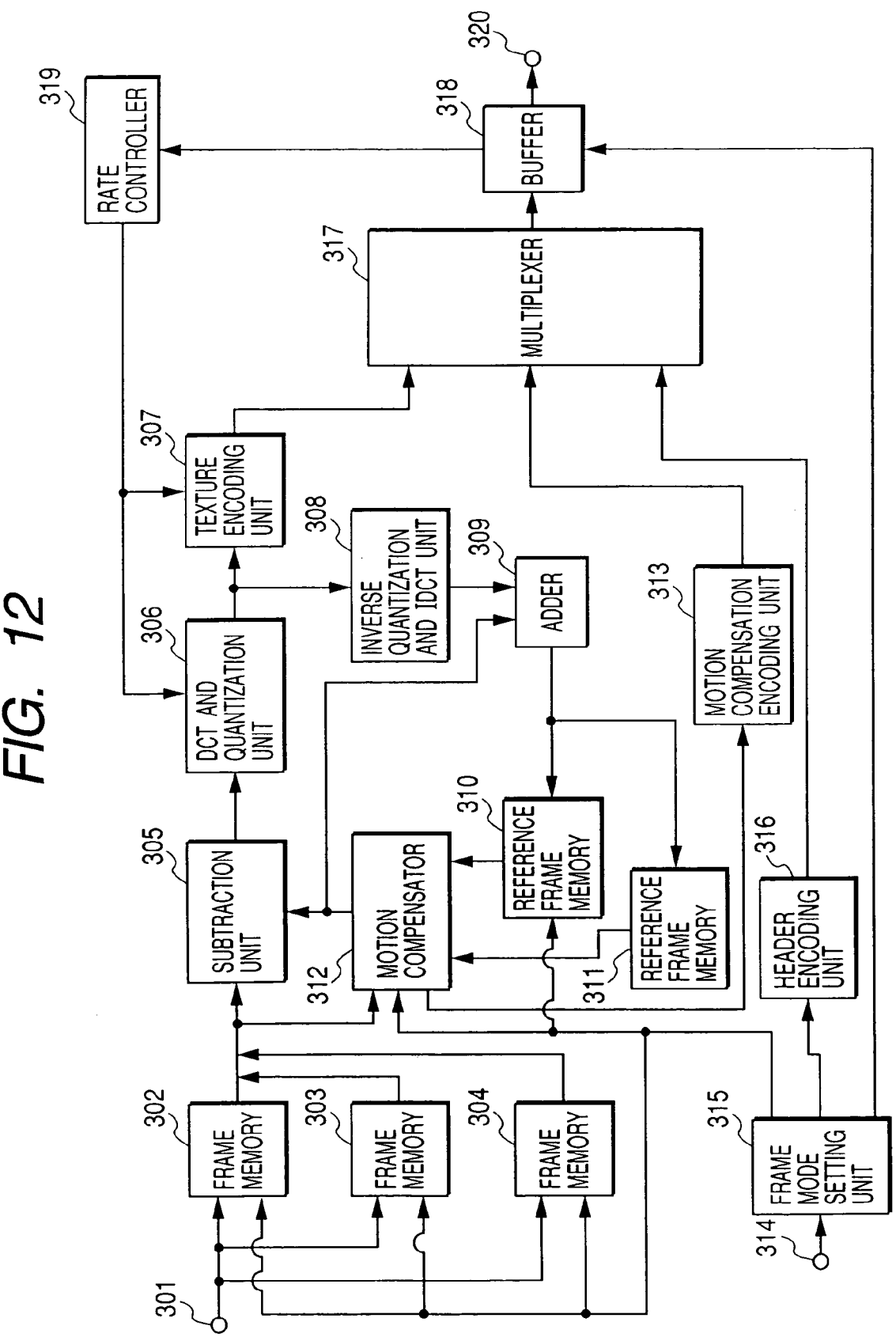
FIG. 12 is a block diagram illustrating the arrangement of a video encoding unit according to a second embodiment of the present invention.

FIG. 12 is a detailed block diagram for the video encoding unit 1001 for this embodiment.

In FIG. 12, image data are entered at an input terminal 301, and frame memories 302, 303 and 304 are used to store an image for each frame. A subtraction unit 305 calculates a difference by subtracting the values for pixel units for each macro block. A DCT and quantization unit 306 performs a DCT transform and quantizes a transform coefficient. A texture encoding unit 307 performs entropy encoding for the results obtained by the quantization.

An inverse quantization and DCT unit 308 receives a quantized transform coefficient, and performs an inverse quantization and an inverse DCT transform. An adder 309 adds together the values for the pixels for each macro block, and reference frame memories 310 and 311 are used to store frame images to perform motion compensation. A motion compensation unit 312 calculates a motion vector from one of the frame memories 302, 303 and 304 and the reference frame memory 310 or 311, and performs motion compensation.

A motion compensation encoding unit 313 generates code that is related to motion compensation, such as an encoding mode for a macro block or a motion vector, which is output by the motion compensation unit 312.

A control signal from the control signal generator 105 in FIG. 4 enters an input terminal 314, while a frame mode setting unit 315 sets a frame mode for encoding and a header encoding unit 316 encodes a header including a frame mode. A multiplexer 317 multiplexes the data output by the texture encoding unit 307, the motion compensation encoding unit 313 and the header encoding unit 316. A buffer 318 is used to temporarily store encoded data that are generated by the multiplexer 317.

A rate controller 319 controls the amount of code, and adjusts the quantization coefficient used by the DCT and quantization unit 306. And the data in the buffer 318 is output via an output terminal 320.

The encoding process performed by the thus arranged video encoding unit 1001 will now be explained.

Image data for motion images are sequentially entered at the input terminal 301 and are stored in the frame memory 302. A control signal, which for a frame to be encoded indicates whether the security information denotes "permission" or "prohibition", is entered at the input terminal 314.

First, an explanation will be given for a case wherein the security is not applied and "permission" is entered in the frame mode setting unit 315.

The frame mode setting unit 315 performs the intraframe encoding at a constant interval, and performs interframe encoding for the other frames. In this embodiment, for every 15 frames there is an I frame that is encoded in the I frame mode, another 4 frames are P frames that are encoded in the P frame mode, and the remaining ten frames are B frames that are encoded in the B frame mode. One frame cycle is provided by arranging two B frames between a P frame and an I frame or between two P frames. That is, the frames are arranged as in

I B B P B B P B B P B B P B B I B B P . . . , and in the arrangement, between one I frame and the next there are fifteen other frames.

Frame images are entered in order in the frame memories 302, 303 and 304, i.e., the first frame image is stored in the frame memory 302, the following frame image is stored in the frame memory 303 and the next frame image is stored in the frame memory 304, following which the next frame image is stored in the frame memory 302. The remaining frame image data are then stored in order.

The frame mode setting unit 315 determines the frame mode in accordance with the above frame cycle, and outputs the selected frame mode to the header encoding unit 316. The header encoding unit 316 generates encoded header data in accordance with the MPEG-1 specifications.

Since motion compensation need not be performed when the frame mode setting unit 315 designates the I frame mode, a control signal is transmitted to the motion compensation unit 312 to instruct the output of a value of "0", without motion compensation being performed. Image data are read from one of the frame memories 302, 303 or 304 in which frames to be encoded in the I frame mode are stored.

When the frame mode setting unit 315 designates the P frame mode, motion compensation should be performed. Image data are read from one of the frame memories 302, 303 and 304 in which frames to be encoded in the P frame mode are stored, and also from either one of the reference frame memories 310 and 311 in which the last frame image that was decoded is stored. These image data are transmitted to the motion compensation unit 312 for the motion compensation operation.

When the frame mode setting unit 315 designates the B frame mode, motion compensation should be performed. Image data are read from one of the frame memories 302, 303 and 304 in which frames to be encoded in the B frame mode are stored, and also from both of the reference frame memories 310 and 311. These image data are transmitted to the motion compensation unit 312 for the motion compensation operation. At this time, image data encoded in the B frame mode are not written in the reference frame memories 310 and 311.

In the I frame mode, the motion compensation unit 312 outputs a value of 0 for each macro block (e.g., a block consisting of 16×16 pixels).

In the P frame mode, the motion compensation unit 312 obtains a motion vector by referring to one of the frame memories 302, 303 and 304 in which a frame to be encoded is stored, and the reference frame memory 310 or 311 in which the frame image is stored that was encoded immediately before, and outputs a macro block predicted by the motion compensation.

In the B frame mode, the motion compensation unit 312 obtains a motion vector by examining one of the frame memories 302, 303 and 304 in which a frame to be encoded is stored, and both of the reference frame memories 310 and 311, and outputs a macro block predicted by the motion compensation.

For each macro block, the frame image data read from the frame memory are transmitted to the subtraction unit 305. The subtraction unit 305 subtracts each pixel value from the value for the macro block output by the motion compensation unit 312. The result obtained by the subtraction unit 305 is then output to the DCT and quantization unit 306, which performs a DCT transform for the result. The DCT and quantization unit 306 quantizes the obtained value by using the quantization coefficient.

The result obtained by the DCT and quantization unit 306 is transmitted to the texture encoding unit 307. And according to the MPEG-1 encoding specifications, the texture encoding unit 307 encodes the encoding mode of the macro block, the quantization coefficient and the quantization result (entropy coding (variable length coding) based on Huffmann coding), and outputs the obtained data to the multiplexer 317.

The data output by the DCT and quantization unit 306 are transmitted to the inverse quantization and IDCT unit 308, which then performs an inverse DCT transform to obtain pixel data, or error data due to motion compensation. The error data are added to the result obtained by the motion compensation unit 312 by the adder 309.

In only the I frame mode or the P frame mode, the pixel value obtained by the adder 309 is stored in the reference frame memory 310, or in a reference frame memory in which the image data encoded in the past was stored.

The motion vector obtained by the motion compensation unit 312 is transmitted to the motion compensation encoding unit 313, which encodes the motion vector and outputs the encoded vector to the multiplexer 317.

According to the MPEG-1 form, the multiplexer 317 multiplexes the values output by the texture encoding unit 307, the motion compensation encoding unit 313, the header encoding unit 316, and outputs the result to the buffer 318.

The encoded data stored in the buffer 318 are output via the output terminal 320, while the rate controller 319 monitors the amount of code stored in the buffer 31 and controls the amount of generated code by changing the quantization coefficient of the DCT and quantization unit 306.

An explanation will now be given for a case wherein the security is applied and the information is changed from permission to prohibition.

At this time, the frame mode setting unit 315 changes a frame mode by using the frame mode processed immediately before the indicated security information is changed from "permission" to "prohibition". This state is shown in FIGS. 13A to 13E.

FIGS. 13A to 13E are diagrams for explaining the changing of the encoding mode when the security information is changed from permission to prohibition.

In FIGS. 13A to 13E, $I_*$ represents a frame encoded in the I frame mode, $P_*$ represents a frame encoded in the P frame mode, and $B_*$ represents a frame encoded in the B frame mode. An arrow indicates a location whereat prohibition is designated by security information.

In the example in FIG. 13A, the pertinent frame is the head of motion image data, or the head of a Group of Pictures and has a closed_gop code of 1 (a flag that is one of the data sets included in MPEG encoded data and that indicates an image in a GOP can be reproduced separately from other GOPs), and decoding is prohibited beginning at frame $B_1$, which follows frame $I_0$. At this time, even if decoding is terminated at frame $I_0$ in accordance with the code order, unsuccessful decoding does not occur, and since there is no frame for which deterioration of an image has occurred, the frame mode is not changed.

In the example in FIG. 13B, the decoding is prohibited beginning at frame $B_2$, which follows frames $I_0$ and $B_1$. At this time, although frame $P_3$ is displayed after frame $B_1$ in the display order, frame $P_3$ is located before frame $B_1$ in the code order, so that if frame $P_3$ is decoded, it may be displayed on the decoding side. Therefore, frame $B_1$, which was originally encoded in the B frame mode, is changed to encode in the P frame mode. And then, the order of the code following the change shown in FIG. 13B is obtained, and frame $P_3$ is not referred to. Even if frame $P_3$ is encoded in the I frame mode, the frame mode is changed in the same manner.

In the example in FIG. 13C, decoding is prohibited beginning at frame $P_3$, which follows frames $I_0$, $B_1$ and $B_2$. Since as in FIG. 13B frame $P_3$ is located before frame $B_2$, if frame $P_3$ is decoded it may be displayed by the decoding side. Therefore, frames $B_1$ and $B_2$, which originally were in the B frame mode are changed to encode in the P frame mode. Then, the order of the code following the change shown in FIG. 13C is obtained, and frame $P_3$ is not referred to. Even if frame $P_3$ is encoded in the I frame mode, the frame mode is changed in the same manner.

In the example in FIG. 13D, decoding is prohibited beginning at the frame next to frame $P_3$. Since frame $P_3$ is located before frames $B_1$ and $B_2$, frames $B_1$ and $B_2$ may not be decoded. Therefore, frames $B_1$ and $B_2$, which were originally in the B frame mode, are changed to encode in the P mode. Then, the order of the code following the change shown in FIG. 13D is obtained, and frames $P_1$ and $P_2$ are decoded without requiring a special structure for the decoding side. Even if frame $P_3$ is encoded in the I frame mode, as is shown in FIG. 13E, the frame mode is changed in the same manner.

An explanation will now be given for a case wherein the security is released and the security information is changed from prohibition to permission.

At this time, the frame mode setting unit 315 changes a frame mode by using the preceding and succeeding frame modes when the indicated security information is changed from "permission" to "prohibition". This state is shown in FIGS. 14A to 14E.

FIGS. 14A to 14E are diagrams for explaining the changing of the encoding mode when the indicated security information is changed from prohibition to permission.

In FIGS. 14A to 14E, an arrow indicates the location at which security is released and decoding is enabled.

Figures 14A, 14B, 14C, 14D, 14E:
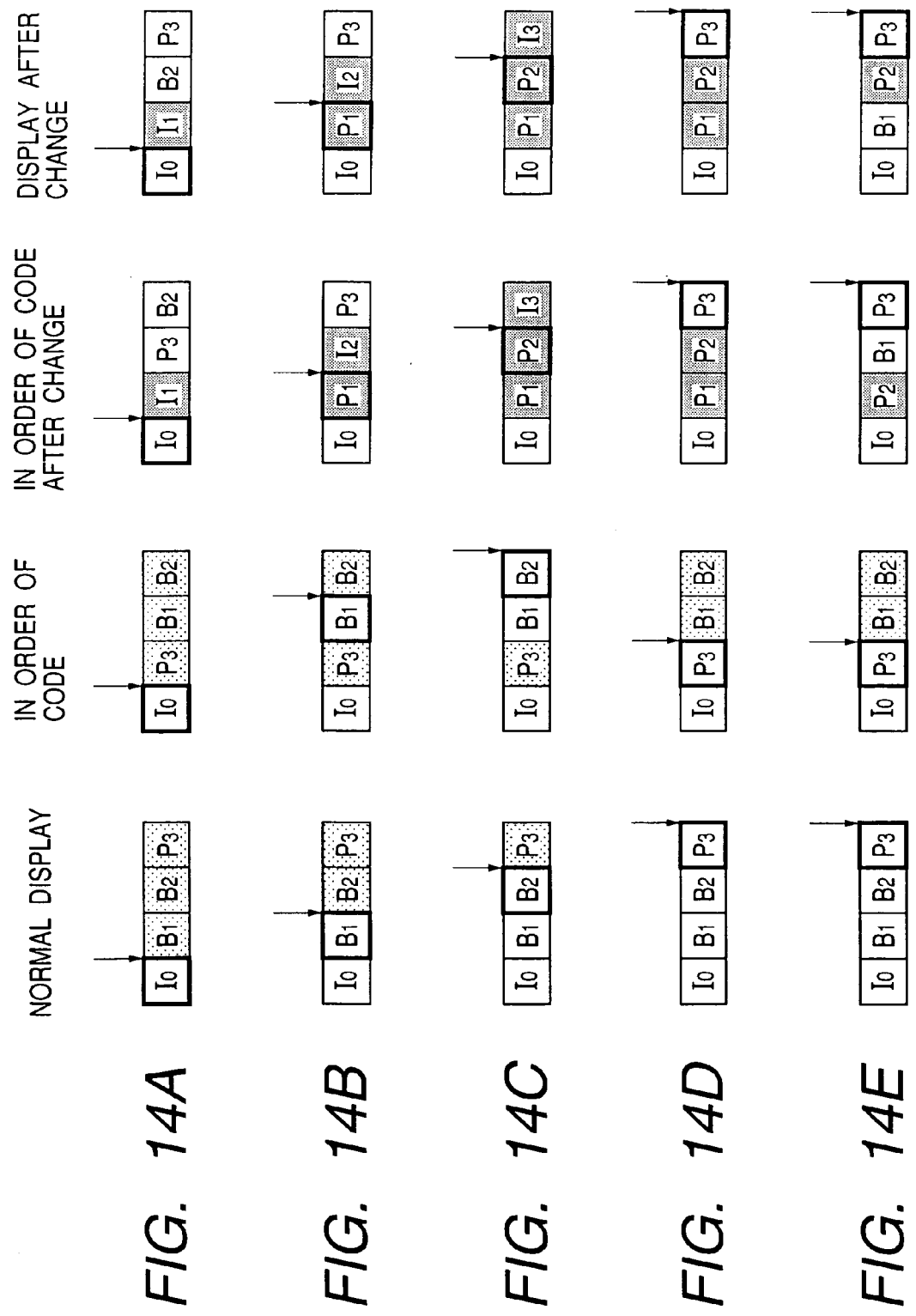
FIGS. 14A, 14B, 14C, 14D and 14E are diagrams for explaining the change from security information for prohibiting an encoding mode to security information permitting an encoding mode according to the second embodiment of the present invention.

In the example in FIG. 14A, the pertinent frame is the head of motion image data, or the head of a Group of Pictures having a closed_gop code of 1, and decoding is permitted beginning at frame $B_1$, which follows frame $I_0$. At this time, a problem arises in that frames $B_1$, $B_2$ and $P_3$, which follow frame $I_0$, can not be correctly decoded because these frames refer to frame $I_0$. Therefore, frame $B_1$ is changed to encode in the I frame mode. Then, the order of the code following the change shown in FIG. 14A is obtained, and frames $B_2$ and $P_3$ can be correctly displayed without requiring a special structure for the decoding side. Even if frame $P_3$ is encoded in the I frame mode, the frame mode is changed in the same manner.

In the example in FIG. 14B, decoding is permitted beginning at frame $B_2$, which follows frames $I_0$ and $B_1$. At this time, a problem arises in that frames $B_2$ and $P_3$ can not be correctly decoded because these frames refer to frame $I_0$. Therefore, frame $B_2$ is changed to encode in the I frame mode and frame $P_3$ is changed to encode in the P frame mode. Then, the order of the code following the change shown in FIG. 14B is obtained, and frames $I_2$ and $P_3$ can be correctly displayed without requiring a special structure for the decoding side. Even if frame $P_3$ is encoded in the I frame mode, the frame mode is changed in the same manner.

In the example in FIG. 14C, decoding is permitted beginning at frame $P_3$, which follows frames $I_0$, $B_1$ and $B_2$. At this time, a problem arises in that frame $P_3$ can not be correctly decoded because frame $P_3$ refers to frame $I_0$. In addition, frames $B_1$ and $B_2$ are located after $P_3$, and another problem arises concerning the decoding and displaying process to be performed for these frames. To obtain the correct order for the code, frames $P_3$ and $B_1$ are changed to encode in the P frame mode, and frame $B_2$ is changed to encode in the I frame mode. Then, the order of the code following the change shown in FIG. 14C is obtained, and frame $P_3$ can be correctly displayed without requiring a special structure for the decoding side. Even if frame $P_3$ is encoded in the I frame mode, the frame mode is changed in the same manner.

In the example in FIG. 14D, decoding is permitted beginning at a frame next to frame $P_3$. At this time, since frame $P_3$ is located before frames $B_1$ and $B_2$ in the order of the code, frames $B_1$ and $B_2$ may be decoded, so that the encoded data $B_1$ and $B_2$ must be located before frame $P_3$. Therefore, frames $B_1$ and $B_2$ are changed to encode in the P frame mode, and the scene following frame $P_3$ is encoded in the I frame mode. Then, the order of the code following the change shown in FIG. 14D is obtained, and the frames following frame $P_3$ can be correctly displayed without requiring a special structure for the decoding side. Even if frame $P_3$ is encoded in the I frame mode, the frame mode is changed in the same manner.

Or, as is shown in FIG. 14E, frame $B_1$ may be encoded by referring to frames $I_0$ and $P_2$, and frame $B_2$ may be encoded in the P frame mode. At this time, the scene next to frame $P_3$ is encoded in the I frame mode.

The frames are encoded in accordance with these encoding modes, and if there is no change in the encoding mode as it is related to the security, the normal cycle is used in encoding the frames.

The encoded motion image data output by the output terminal 320 are multiplexed with the encoded security data by the multiplexer 1002, as in the first embodiment.

Since the decoding process is the same as that in the first embodiment, no explanation for this process will be given.

Through the above described selective process sequence, the frame mode is changed, due to the security, for a frame for which decoding is halted or resumed, or for the preceding or succeeding frame, and motion compensation is not performed until, in accordance with the security, a decoding prohibition or a decoding permission instruction is issued. Therefore, without requiring a special structure for the decoding side, the deterioration of images in frames and the interruption of the decoding operation can be easily prevented.

Figure 15:
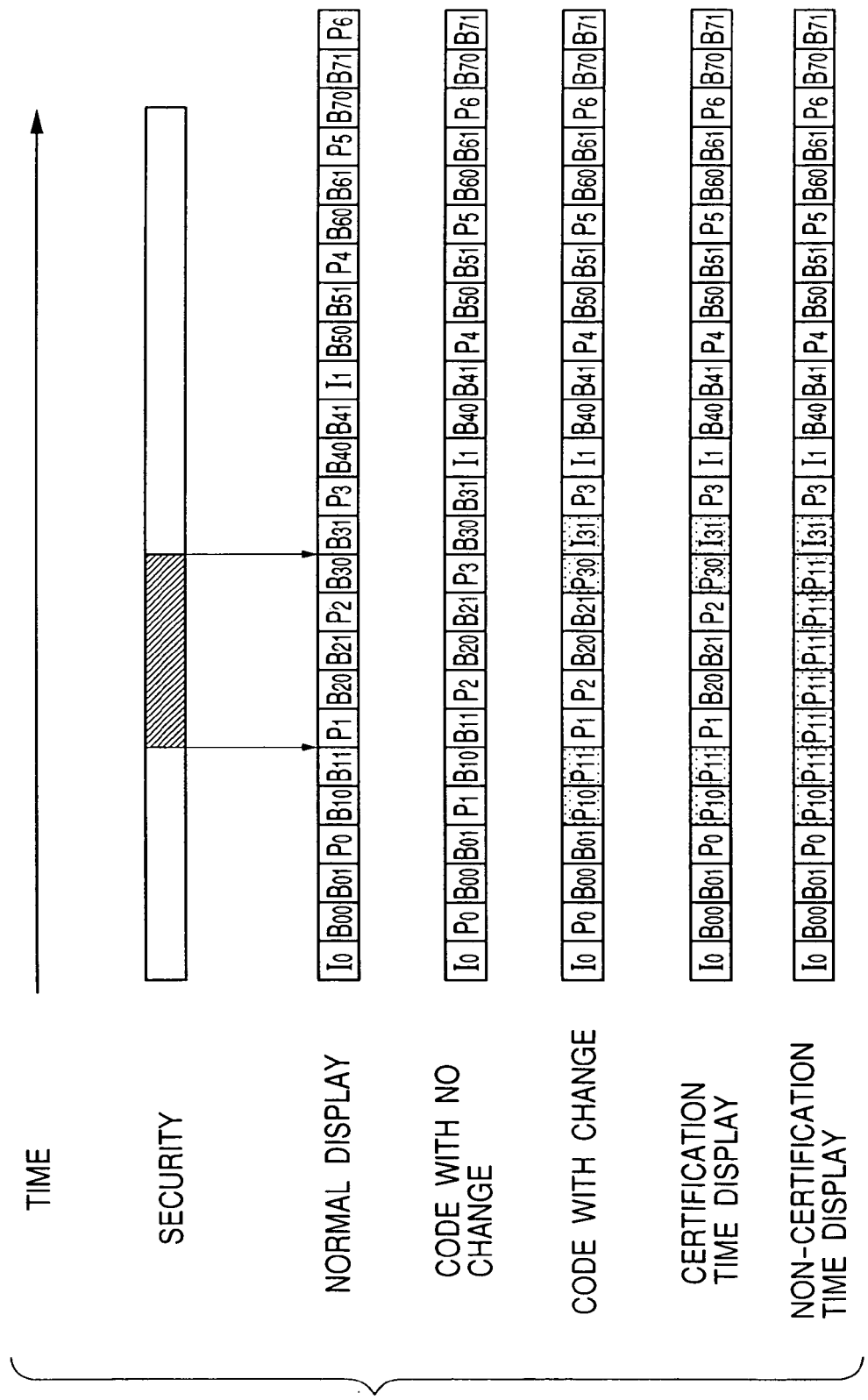
FIG. 15 is a diagram for explaining the decoding process according to the second embodiment of the present invention.
Figures 18A, 18B, 18C, 18D, 18E:
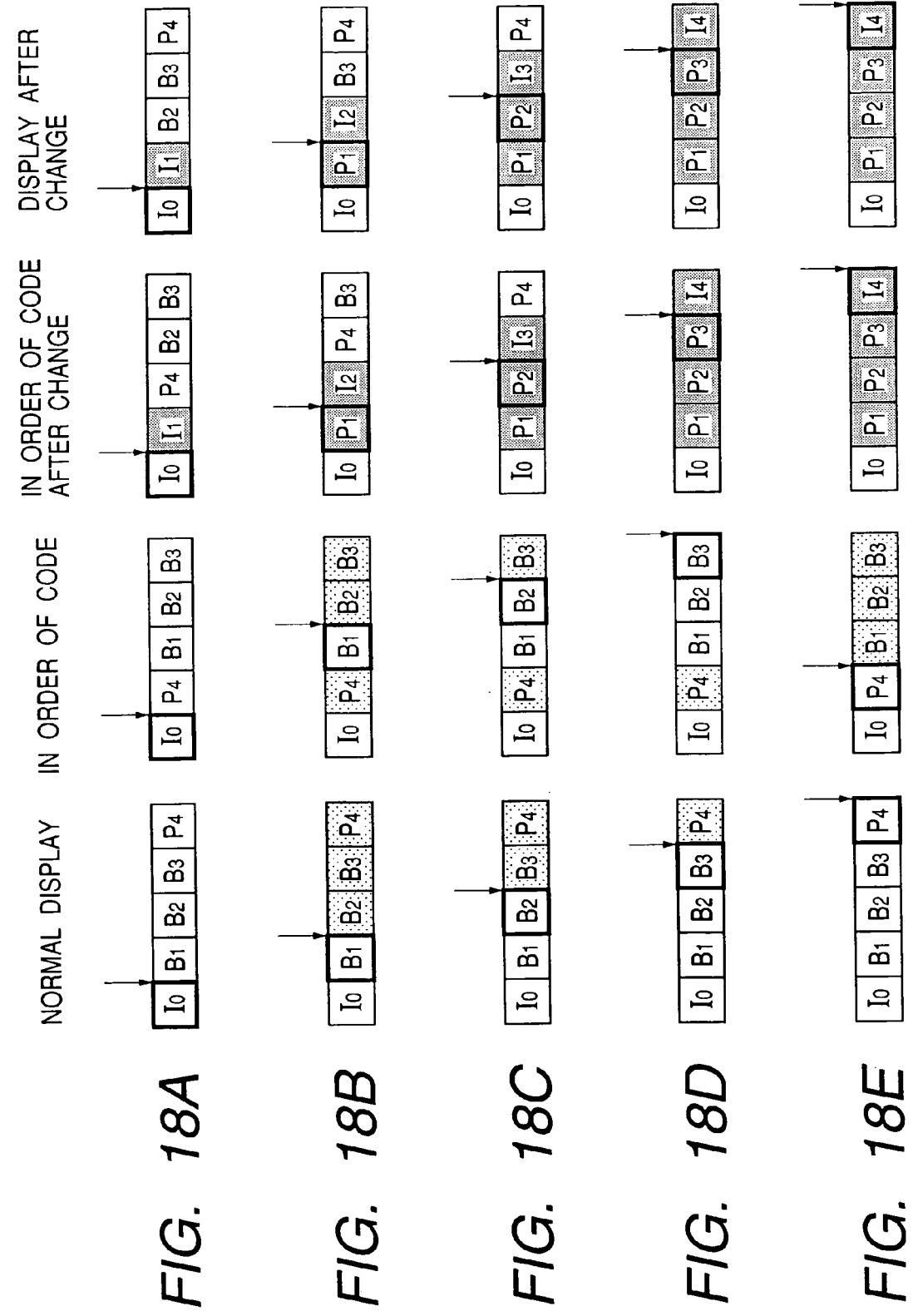
FIGS. 18A, 18B, 18C, 18D and 18E are diagrams for explaining a change from security information prohibiting an encoding mode to security information permitting an encoding mode according to the second embodiment of the present invention.

Suppose that, as is shown in FIG. 15, the protection (Security) for a copyright is applied for an interval between encoded frames $P_1$ and $B_{30}$, and that the frames can not be certified. In this case, since the frame $P_{11}$ located immediately before the Security is applied is continuously displayed, and since the frame located immediately after the Security is released is always an I frame, correct decoding can be performed beginning with the frame processed immediately after the Security is unlocked, and the discontinuity of images or the deterioration of images can be prevented. In addition, there is no delay (scene skipping) between the unlocking of the Security and the image recovery, and a normal image can be provided for a user.

In this embodiment, the image decoded immediately before decoding is prohibited is output during the period in which decoding is prohibited. However, a predetermined image may be stored in a memory in advance, and may be output during the above period.

The memory structures can be changed as needed in this embodiment. The encoding system for motion images is not limited to the MPEG-1 coding system; the MPEG-2 coding system can also be employed, with a frame being used as a field, and the H.261 or H.263 coding system can be used as well.

In addition, even if the structure of the GOP is changed as in

I B B B P B B B P B B B P B B B I B B B P B B B P . . .

when decoding is halted, the frame mode is changed as is shown in FIGS. 16A to 16E or FIGS. 17A to 17E, and when decoding is resumed, the frame mode is changed for a target frame and the preceding and succeeding frames, as is shown in FIGS. 18A to 18E, so that motion compensation is not performed until, in accordance with the security, a decoding prohibition or a decoding permission instruction is issued. Therefore, without requiring a special structure for the decoding side, the deterioration of images in frames and the interruption of the decoding operation can be easily prevented. An arbitrary cycle can be employed to carry out this process.

Further, the B frame mode can be changed not only to the P frame mode, but also to the I frame mode.

Figure 19:
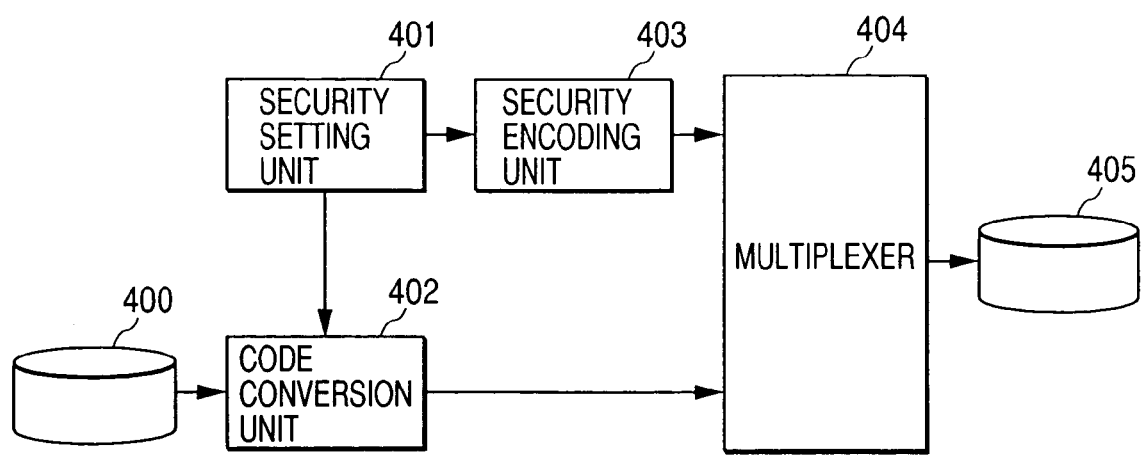
FIG. 19 is a block diagram illustrating an image processing apparatus according to a third embodiment of the present invention.

FIG. 19 is a block diagram illustrating an image processing apparatus according to a third embodiment of the present invention.

In FIG. 19, a storage device 400 is used to store encoded motion image data. In this embodiment, to simplify the explanation either the H.261 or the H.263 coding system, which does not employ a bidirectional predictive coding mode, is used as the system for encoding motion image data. This embodiment can be applied for an MPEG-1 or 2 coding system that does not employ a bidirectional predictive coding mode (a B frame mode).

A security setting unit 401 sets security information for permitting or prohibiting the reproduction of part or all of the motion images. A code conversion unit 402 converts encoded motion image data in accordance with an instruction received from the security setting unit 401. A security encoding unit 403 encodes security information. A multiplexer 404 multiplexes encoded security data with encoded motion image data, and generates motion image data. And a storage unit 405 is used for the storage of motion image data.

The motion image data processing performed by the thus arranged image processing apparatus will now be described.

An operator (not shown) selects encoded motion image data stored in the storage unit 400, and inputs, to the security setting unit 401, the times to start and end the protection for a copyright for the encoded motion image data, and security information that indicates a key used to release security.

The security setting unit 401 rearranges the received security information following the order of the times at which the decoding prohibited commands appear, and stores this arrangement for use when a frame is identified that corresponds to a motion image. The security encoding unit 403 encodes the security information, and outputs the encoded security data to the multiplexer 404. And the code conversion unit 402 converts code for a corresponding frame and a preceding or succeeding frame.

The code conversion unit 402 will now be described in detail.

Figure 20:
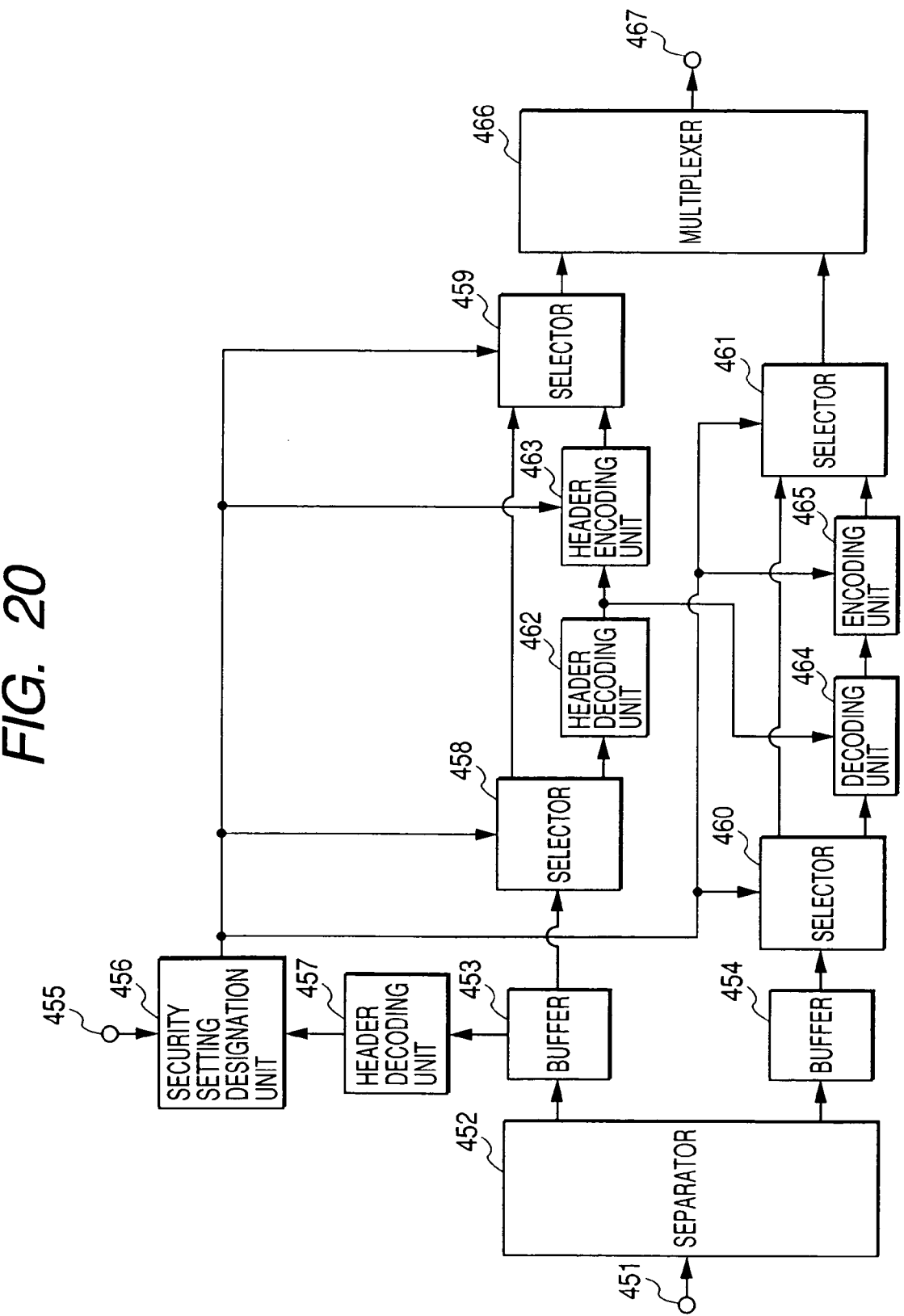
FIG. 20 is a block diagram illustrating a code conversion unit according to the third embodiment of the present invention.

FIG. 20 is a detailed block diagram illustrating the code conversion unit 402 according to the third embodiment.

In FIG. 20, an input terminal 451 is used to enter encoded motion image data, and a separator 452 separates, into header code and encoded image data, the data that are encoded by the H.261 or the H.263 coding system.

The header code is that which is obtained by encoding information representing the code characteristics, such as various start codes, the size of an image, a bit rate and a frame mode. The encoded image data is a code that represents a motion image, such as quantized data code, motion vector code, or the encoding mode for a macro block.

Buffers 453 and 454 are used for the temporary storage of codes provided by the separator 452. An input terminal 455 is used to enter the encoded security data received from the security setting unit 401 for each frame. A security setting instruction unit 456 determines what security to set for each frame and issues instructions to the individual units. And header decoding units 457 and 462 decode the header code.

Selectors 458, 459 460 and 461 select input/output data in accordance with the instructions received from the security setting instruction unit 456. A header encoding unit 463 encodes header information, and a decoding unit 464 decodes encoded image data to obtain a motion image. And an encoding unit 465 encodes motion image data to obtain encoded image data.

A multiplexer 466 multiplexes generated codes to obtain H.261 or H.263 encoded data, and an output terminal 467 is used to output the encoded motion image data obtained by the multiplexer 466.

The encoding process performed by the thus arranged code conversion unit 402 will now be described.

Motion image data are sequentially received at the input terminal 451, and are separated into header code and encoded image data by the separator 452. The header code is stored in the buffer 453, and the encoded image data are stored in the buffer 454.

The header code stored in the buffer 453 is decoded by the header decoding unit 457, and the encoding mode for a frame is obtained and output to the security setting instruction unit 456.

The security setting instruction unit 456 determines whether security is to be applied for the individual frames, and analyses the frame modes of frames that, along a time axis, precede and follow a frame whereat the security is started and a frame whereat the security is ended.

As a result of the analysis, for a frame for which the frame mode must be changed, the security setting instruction unit 456 operates the selectors 458, 459, 460 and 461, so that the pertinent frame is passed through the header decoding unit 462, the header encoding unit 463, the decoding unit 464 and the encoding unit 465. The security setting instruction unit 456 also transmits a new frame mode to the header encoding unit 463. If the frame mode does not need to be changed, input/output data that pass through the above components is selected.

First, an explanation will be given for a case wherein the security is not applied and the frame mode does not have to be changed by the security setting instruction unit 456.

The security setting instruction unit 456 issues instructions to the selectors 458, 459, 460 and 461 to pass a frame through the header decoding unit 462, the header encoding unit 463, the decoding unit 464 and the encoding unit 465. The encoded data stored in the buffers 453 and 454 are read for each frame and are output to the multiplexer 466. The multiplexer 466 performs a reverse operation as the separator 452, and generates the same code as was entered and outputs it via the output terminal 467.

An explanation will now be given for a case wherein the security is applied and the indicated security information is changed from permission to prohibition.

As in the first embodiment, the frame mode is not changed, i.e., the same process is performed as is performed when the security is not applied.

Finally, an explanation will be given for a case wherein the security is released and the indicated security information is changed from prohibition to permission.

The frame mode setting unit 304 forcibly sets, to the I frame mode, the frame mode of the first frame after the security is released. As in the first embodiment, all the frames up to the next I frame are encoded in the P frame mode.

That is, the security setting instruction unit 456 issues instructions to the selectors 458, 459, 460 and 461 to pass the frame through the header decoding unit 462, the header encoding unit 463, the decoding unit 464 and the encoding unit 465.

Specifically, the following process is performed.

Encoded data stored in the buffers 453 and 454 are read for each frame. The header decoding unit 462 decodes the header code, and the header encoding unit 463 encodes the decoded header code by replacing it with information concerning the frame mode. The encoded data obtained by the header encoding unit 463 are then output via the selector 459 to the multiplexer 466.

The decoding unit 464 decodes the image data, and reproduces an image for a frame, and the encoding unit 465 encodes the frame in the frame mode instructed by the security setting instruction unit 456. The encoded data obtained by the encoding unit 465 are then output via the selector 461 to the multiplexer 466.

The multiplexer 466, performing an operation that is the reverse of that performed by the separator 452, multiplexes the encoded data and outputs the obtained data via the output terminal 467. The following process corresponds to the one performed when the indicated security data is permission.

Since, through the above described process sequence, the encoded data are converted in accordance with the state of the security, even if security data are added, the deterioration of images in frames on the decoding side and the interruption of the decoding operation can be easily prevented.

The memory structures can be changed as needed in this embodiment. The encoding system for motion images is not limited to the H.261 or the H.263 coding system, and the MPEG-1 or 2 coding systems can be employed. So long as the same process is performed for each object, the MPEG-4 coding system can also be employed.

The arrangement of an image processing apparatus according to a fourth embodiment is the same as that in FIG. 19, and only the internal arrangement and the processing performed by a code conversion unit 402 differ. Therefore, for the fourth embodiment, only the structure and the operation of the code conversion unit 402 will be explained. In this embodiment, to simplify the explanation, the MPEG-1 coding system, which employs a bidirectional predictive coding mode, is used as the system for the encoding of motion image data. For this embodiment, the MPEG-2 and 4 coding systems, and the H.261 and H.263 coding systems can be applied.

Figure 21:
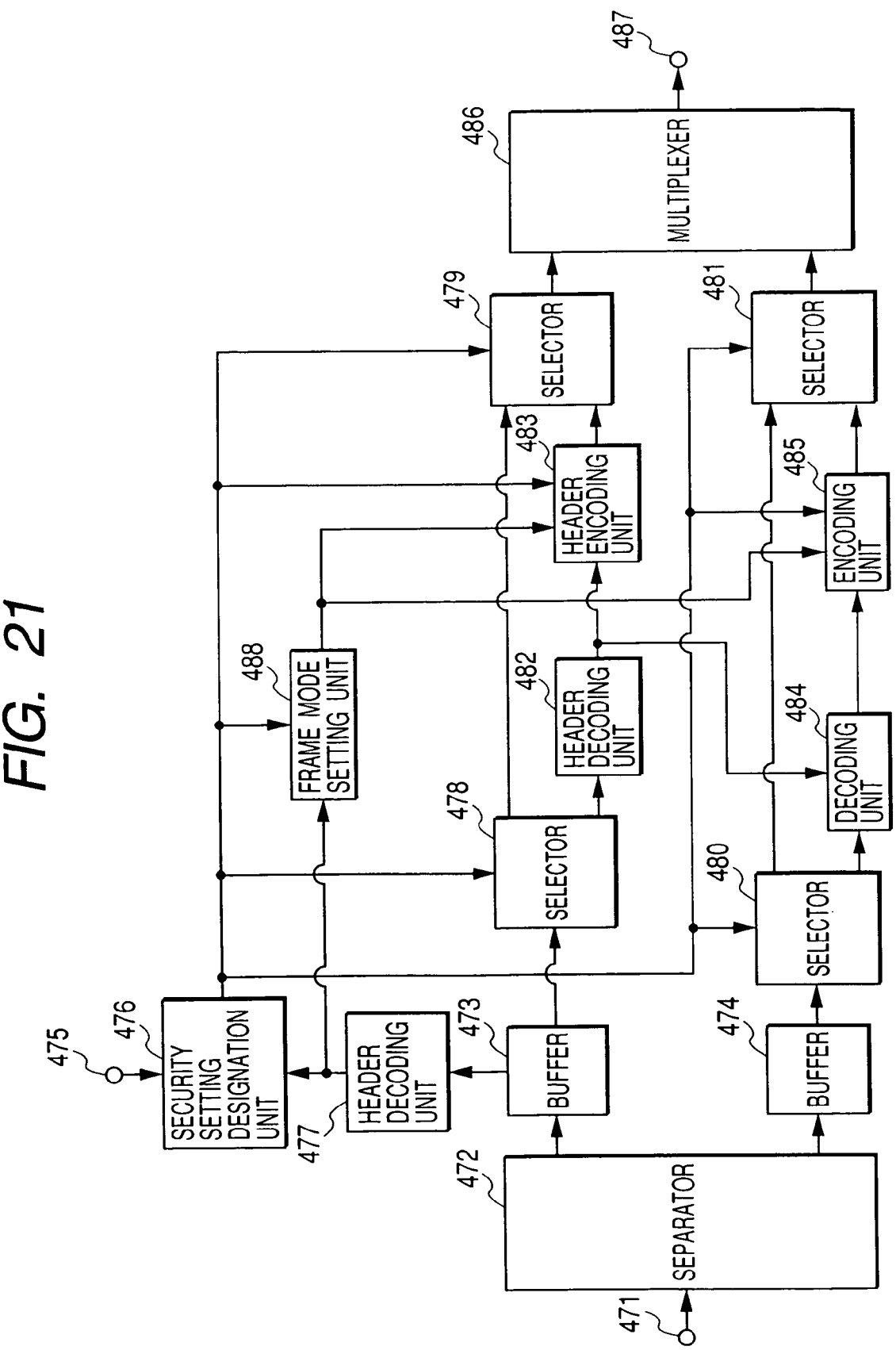
FIG. 21 is a block diagram illustrating a code conversion unit according to a fourth embodiment of the present invention.

FIG. 21 is a detailed block diagram illustrating the code conversion unit 402 according to the fourth embodiment.

In FIG. 21, an input terminal 471 is used to receive encoded motion image data, and a separator 472 separates, into header code and encoded image data, the data that are encoded by the MPEG-1 coding system.

The header code is the one obtained by encoding information representing the code characteristics, such as various start codes, the size of an image, a bit rate, and a frame mode. The encoded image data is code, such as quantized data code, motion vector code, or the encoding mode for a macro block, that represents a motion image.

Buffers 473 and 474 are used for the temporary storage of codes obtained by the separator 472. An input terminal 475 is used to enter for each frame the encoded security data received from the security setting unit 401. A security setting instruction unit 476 determines what security to set for each frame and issues instructions to the individual units. Header decoding units 477 and 482 decode the header code.

Selectors 478, 479 480 and 481 select input/output data in accordance with instructions received from the security setting instruction unit 476. A header encoding unit 483 encodes header information, and a decoding unit 484 decodes encoded image data to obtain a motion image. And an encoding unit 485 encodes motion image data to obtain encoded image data.

A multiplexer 486 multiplexes generated codes to obtain MPEG-1 encoded data, and an output terminal 487 is used to output the encoded motion image data obtained by the multiplexer 486.

A frame mode setting unit 488 sets a frame mode by using the frame modes of the individual frames and the security information that is output by the security setting instruction unit 476.

The encoding process performed by the thus arranged code conversion unit 402 will now be described.

Motion image data are sequentially received at the input terminal 471, and are separated into header code and encoded image data by the separator 472. The header code is stored in the buffer 473, and the encoded image data are stored in the buffer 474.

The header code stored in the buffer 473 is decoded by the header decoding unit 477, and the encoding mode for a frame is obtained and output to the security setting instruction unit 476.

The security setting instruction unit 476 determines whether security is to be applied to individual frames, and analyses the frame modes of frames that precede and succeed, along a time axis, a frame whereat the security is started and a frame whereat the security is ended.

As a result of the analysis, for a frame for which the frame mode must be changed, the security setting instruction unit 476 operates the selectors 478, 479, 480 and 481, so that the pertinent frame is passed through the header decoding unit 482, the header encoding unit 483, the decoding unit 484 and the encoding unit 485. The security setting instruction unit 476 also transmits a new frame mode to the header encoding unit 483. If the frame mode does not have to be changed, the input/output data that pass through the above components is selected.

First, an explanation will be given for a case wherein the security is not applied and the frame mode does not have to be changed by the security setting instruction unit 476.

The security setting instruction unit 476 issues instructions to the selectors 478, 479, 480 and 481 to pass a frame through the header decoding unit 482, the header encoding unit 483, the decoding unit 484 and the encoding unit 485. In addition, the security setting instruction unit 476 does not permit the frame mode setting unit 488 to be activated.

The encoded data stored in the buffers 473 and 474 are read for each frame and are output to the multiplexer 486. The multiplexer 486 performs a reverse operation as the separator 472, generates the same code as was entered, and outputs the code via the output terminal 487.

An explanation will now be given for a case wherein the security is applied and the indicated security information is changed from permission to prohibition.

The frame mode is changed as in the second embodiment. The frame mode setting unit 488 is activated and selects one of timings shown in FIGS. 13A to 13D as the timing in accordance with which the security is applied, and determines the encoding modes of the frames preceding and succeeding the determined time.

The security setting instruction unit 476 issues instructions to the selectors 478, 479, 480 and 481 to pass the frame through the header decoding unit 482, the header encoding unit 483, the decoding unit 484 and the encoding unit 485.

Specifically, the following process is performed.

Encoded data stored in the buffers 473 and 474 are read for each frame. The header decoding unit 482 decodes the header code, and the header encoding unit 483 encodes the decoded header code by replacing the information concerning the frame mode. The encoded data obtained by the header encoding unit 483 are then output via the selector 479 to the multiplexer 486.

The decoding unit 484 decodes image data, and reproduces an image for a frame, and the encoding unit 485 encodes the frame in the frame mode instructed by the security setting instruction unit 476. The encoded data obtained by the encoding unit 485 are output via the selector 481 to the multiplexer 486. The decoding and encoding are periodically performed in the designated frame mode untill the next I frame is reached.

The multiplexer 486 performs an operation that is the reverse of that performed by the separator 472, and multiplexes encoded data and outputs the obtained data via the output terminal 487. The following process corresponds to the one performed when the indicated security data is permission.

Finally, an explanation will be given for a case wherein the security is released and the indicated security information is changed from prohibition to permission.

The frame mode setting unit 488 changes the frame mode in the same manner as in the second embodiment. The frame mode setting unit 488 is activated and selects one of timings shown in FIGS. 14A to 14D as the timing at which the security is released, and determines the encoding mode of the frames that precede and follow the determined time. The decoding and encoding are performed in the same manner as when the security was imposed, encoded data are multiplexed and the resultant data are output via the output terminal 487. The following process corresponds to the one performed when the security data indicates permission.

Since by means of the above described process sequence the encoded data are converted in accordance with the state of the security, even if security data are added, the deterioration of images in frames on the decoding side and the interruption of the decoding operation can be easily prevented.

The memory structures can be changed as needed in this embodiment. The encoding system for motion images is not limited to the MPEG-1 coding system, and the MPEG-2 coding system can also be employed. So long as the same process is performed for each object, the MPEG-4 coding system can be employed as well.

Figure 22:
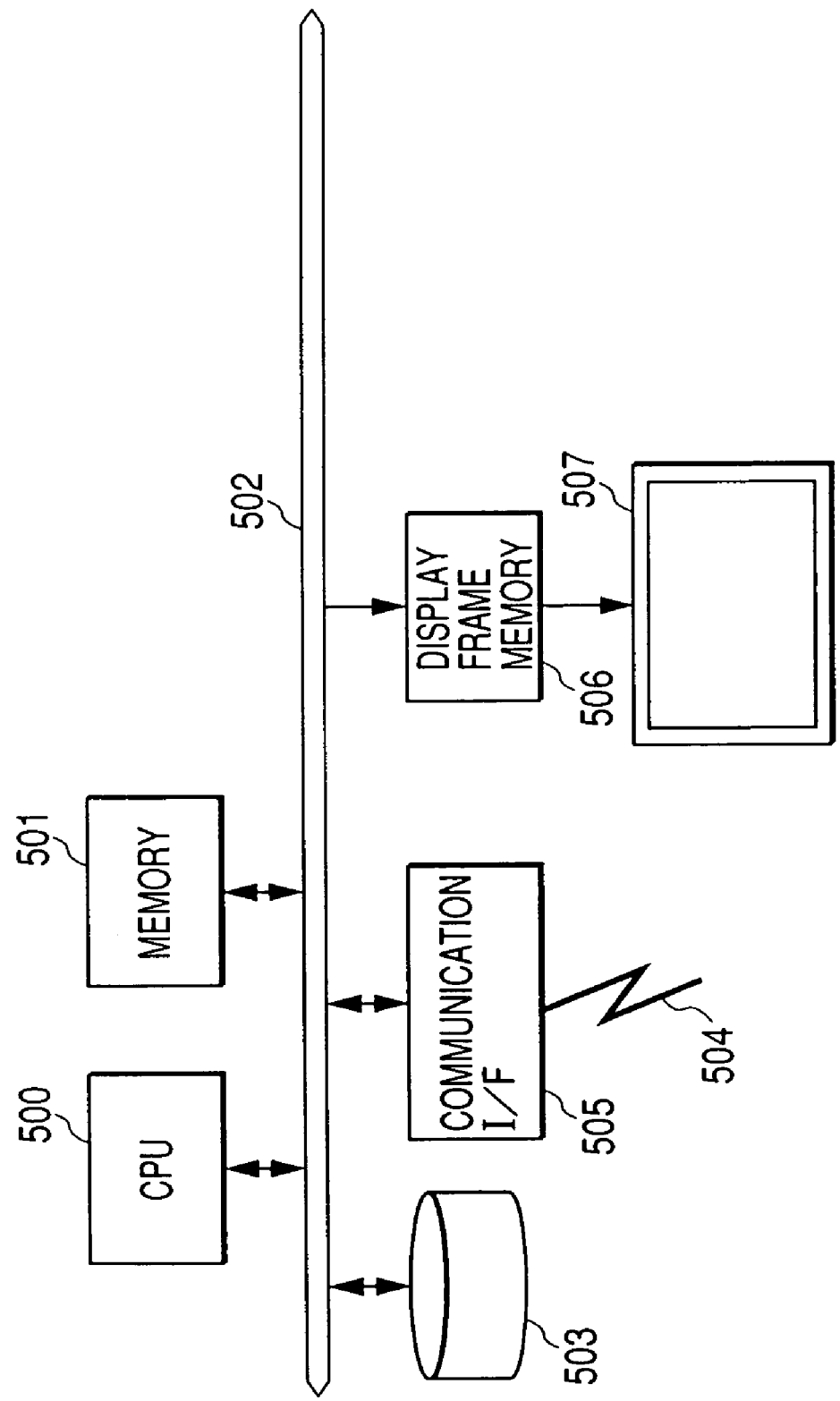
FIG. 22 is a block diagram illustrating an image processing apparatus according to a fifth embodiment of the present invention.

FIG. 22 is a block diagram illustrating the arrangement of an image processing apparatus according to a fifth embodiment of the present invention.

In FIG. 22, a central processing unit (CPU) 500 provides control for the entire apparatus and performs various processes, and a memory 501 provides the storage areas required by an operating system (OS) that is needed to control the apparatus, the software and computation processes.

A bus 502 connects various units to exchange data and control signals; a storage unit 503 is used to store motion image data; and a communication circuit 504 is constituted by a LAN, a public line network, a radio network or a broadcasting radio network.

A communication interface 505 receives motion image data from the communication circuit 504. A display frame memory 506 is used for the storage of frame data for a motion image to be displayed. And a monitor 507 is used to display a reproduced motion image.

Figure 23:
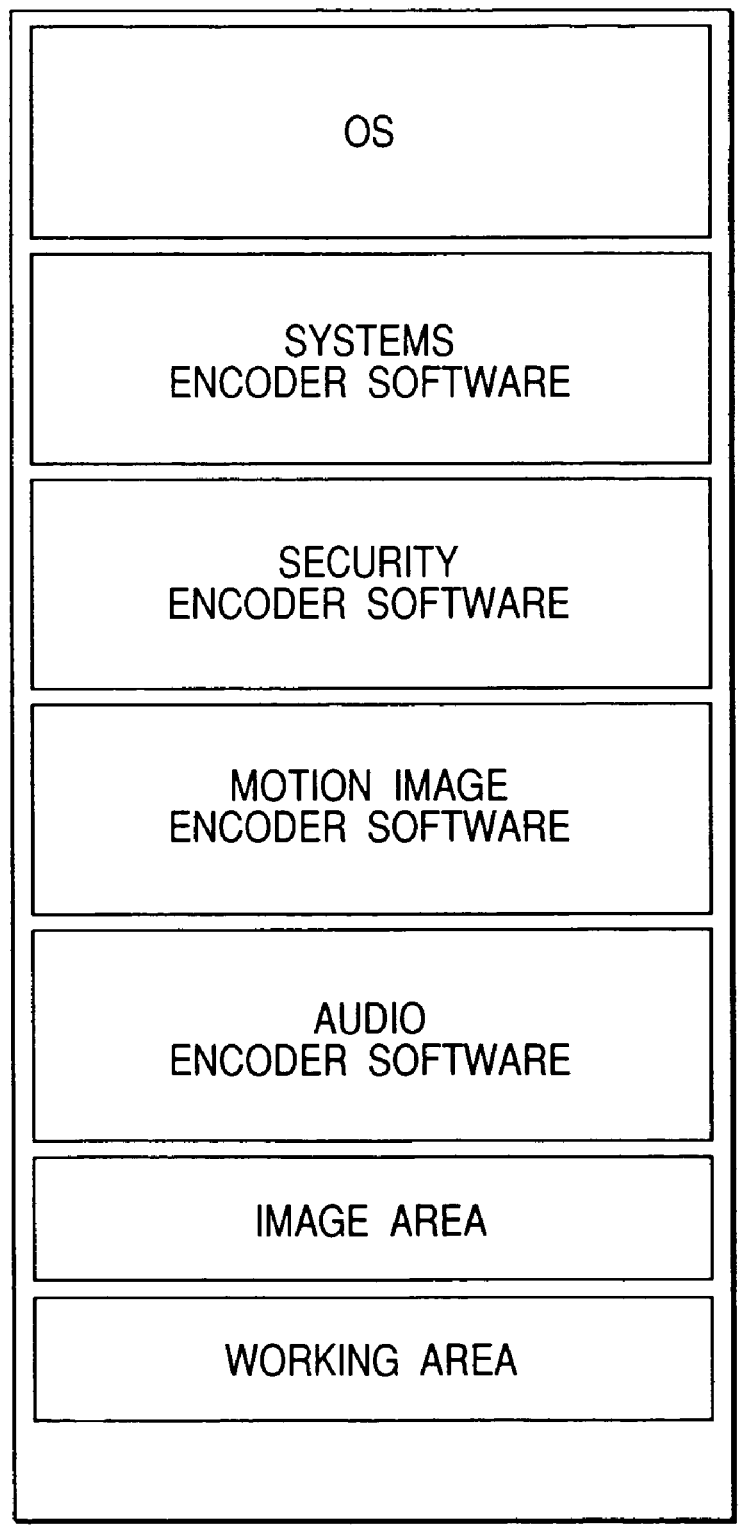
FIG. 23 is a diagram showing the contents of a memory according to the fifth embodiment of the present invention.

FIG. 23 is a diagram showing the use and the data storage condition of the memory 501.

Stored in the memory 501 are: an OS, for the overall control of the overall apparatus and for operating various software programs; Systems encoder software, for encoding information for the synchronous control of voice and motion images; security encoder software, for encoding data to protect a copyright; motion image encoder software, for encoding motion image data; and audio encoder software, for encoding sounds.

In addition, an image area for storing encoded image data used to refer to the data for motion compensation, and a working area for storing calculation parameters are also allocated in the memory 501.

With the above arrangement, before the processing is begun, the Systems encoder is activated to monitor the synchronization of motion images with sounds. The motion image data that include encoded security data, encoded motion image data and encoded audio data are loaded from the storage unit 503 or the communication interface 505, and are stored in the work area for the memory 501. In this explanation, the motion image data are encoded using the H.263 coding system; however, any other coding system that performs motion compensation can be employed.

Figure 24:
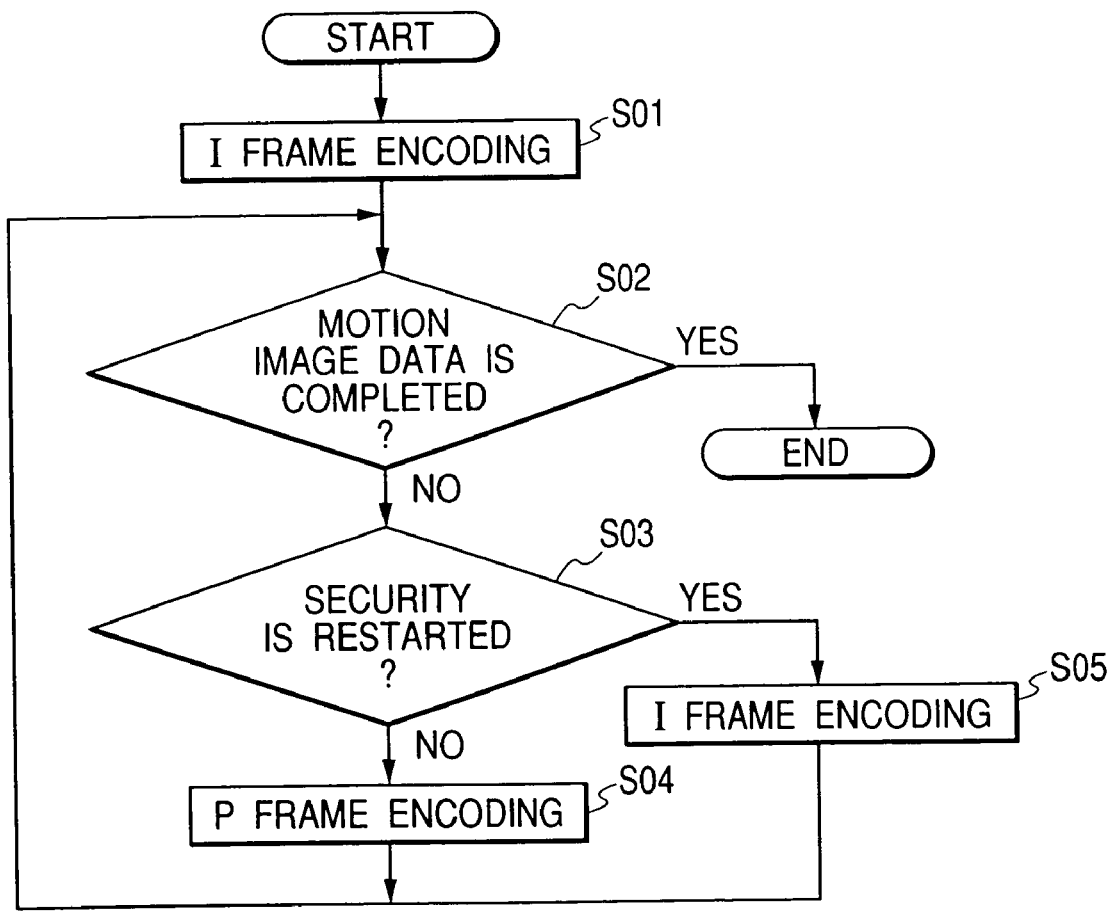
FIG. 24 is a flowchart showing the image processing performed for the fifth embodiment of the presents invention.

An explanation will now be given, while referring to the flowchart in FIG. 24, for the process performed by the CPU 500 to encode motion image data that are stored in the storage unit 503.

First, at step S01, the motion image encoder is activated to encode the first frame in the I frame mode. At step S02, a check is performed to determine whether motion image data have been received from the storage unit 503. When motion image data have been received, program control advances to step S03. When motion image data have not been received, the encoding process is terminated.

At step S03, the security encoder is activated to determine the security information for the pertinent motion image frame. When the indicated security information is changed from prohibition to permission (Restart), program control advances to step S04. Otherwise, program control goes to step S05.

At step S04, the motion image encoder is activated to encode the pertinent motion image in the P frame mode in accordance with the H.263 coding system. Relative to the encoding for the P frame mode, the interframe coding is set so that it is performed once every 132 frames, while macro blocks continue to remain at the same location. The obtained motion image data are multiplexed with the security information, and the resultant data are stored in the work area in the memory 501. Program control then returns to step S02.

At step S05, the motion image encoder is activated to encode the pertinent motion image in the I frame mode in accordance with the H.263 coding system. The obtained motion image data are multiplexed with the security information, and the resultant data are stored in the work area in the memory 501. Program control then returns to step S02.

When the encoding process is terminated, the thus generated encoded data that are stored in the work area are read and stored in the storage unit 503, or are transmitted via the communication interface 305 to the communication circuit 504.

As is described above, the software can be employed to provide one part or all of the apparatus that can correctly decode data without the occurrence of image discontinuity or deterioration, when the security is released and decoding is enabled through the above selective process sequence.

The arrangement and operation of an image processing apparatus according to a sixth embodiment of the present invention is the same as that for the fifth embodiment in FIG. 22, with the exception of the process performed by a CPU 500 to encode motion image data stored in a storage unit 503. Therefore, only the encoding process will be described.

Figure 25:
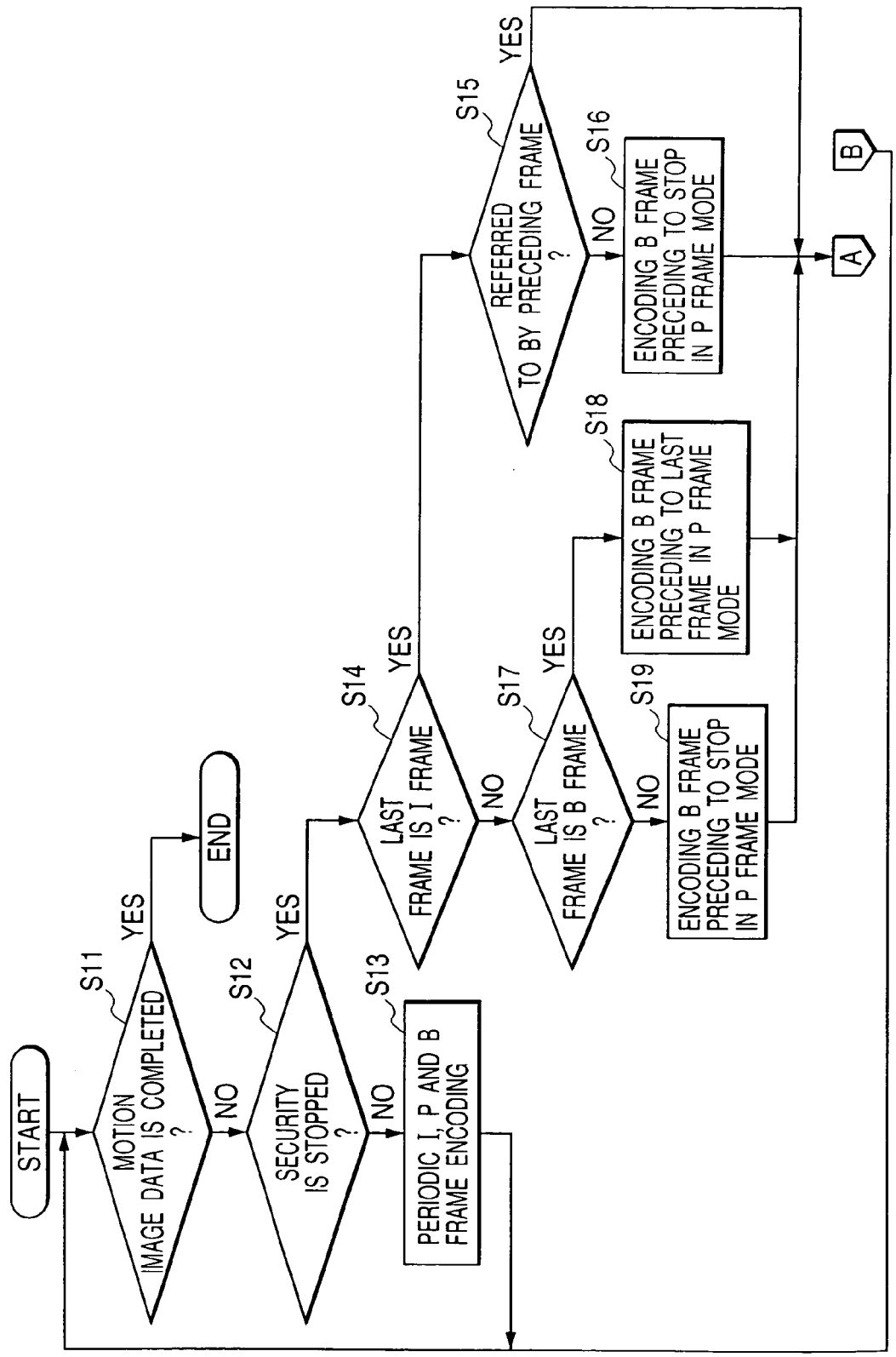
FIG. 25 is a flowchart showing the image processing performed for a sixth embodiment of the presents invention.
Figure 26:
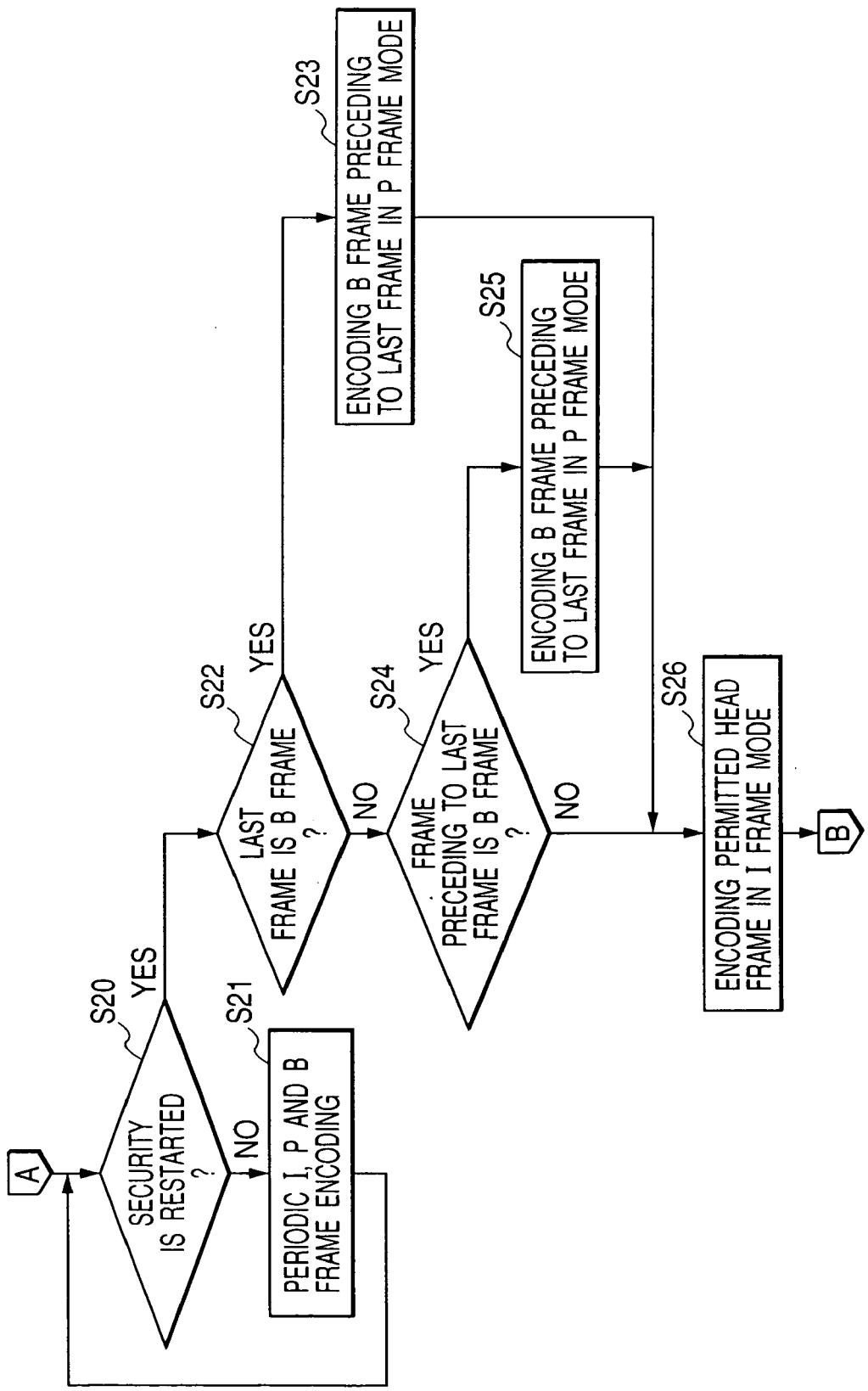
FIG. 26 is a flowchart showing the image processing performed for the sixth embodiment of the presents invention.

The process performed by the CPU 500 for encoding motion image data held in the storage unit 503 will now be explained while referring to the flowcharts in FIGS. 25 and 26.

First, at step S11, a check is performed to determine whether motion image data have been received from the storage unit 503. If motion image data have been received, program control advances to step S12. If motion image data have not been received, the encoding process is terminated.

At step S12, the security encoder is activated to determine the security information that is provided for the pertinent motion image frame. If the indicated security information is permission, program control advances to step S13. If the indicated security information is prohibition (Stop), program control goes to step S14.

At step S13, the motion image encoder is activated to encode the first frame in the I frame mode. Hereinafter, the I frame mode, the P frame mode and the B frame mode are allocated for individual frames in accordance with a cycle that is determined in advance, and the frames are encoded. The encoded data and the security information are multiplexed and the resultant data are stored in the work area in the memory 501. Program control thereafter returns to step S11.

At step S14, a check is performed to determine whether the frame mode of the last frame under the permission condition is the I frame mode. If the last frame is the I frame, program control advances to step S15. If the last frame is the another frame, program control moves to step S17.

At step S15, a check is performed to determine whether the frame preceding the last frame has been encoded by referring to the I frame. If the I frame is not referred to, program control goes to step S20. If the I frame is referred to, program control moves to step S16.

At step S16, the P frame mode is employed to encode frames that include those up to a P frame or an I frame preceding the last frame and are located before the I frame preceding the last frame and are to be encoded in the B frame mode. The obtained encoded data are multiplexed with the security information, and the resultant data are stored in the work area in the memory 501. Program control then moves to step S20.

At step S17, a check is performed to determine whether the frame mode of the last frame under the permission condition is the B frame mode. If the mode for the last frame is the B frame mode, program control advances to step S18. If the mode for the last frame is another frame mode, program control goes to step S19.

At step S18, the P frame mode is employed to encode all the frames up to the P frame or the I frame preceding the last frame, which include the B frame preceding the last frame are to be encoded in the B frame mode. The encoded data are multiplexed with the security information, and the resultant data are stored in the work area in the memory 501. Program control advances then to step S20.

At step S19, the P frame mode is employed to encode all the frames up to the P frame or the I frame before the last frame, which are located before the P frame preceding the last frame and are to be encoded in the B frame mode. Program control advances to step S20.

At step S20, the security encoder is activated to determine the security information for the pertinent motion image frame. When the indicated security information is changed from prohibition to permission (Restart), program control goes to step S22. Otherwise, program control goes to step S21.

At step S21, the motion encoder software is activated and employs the MPEG-2 encoding system to encode motion image data in the individual frame modes in accordance with a cycle that is determined in advance. The encoded data are multiplexed with the security information, and the resultant data are stored in the work area in the memory 501.

At step S22, a check is performed to determine whether the last frame immediately before the indicated security information was changed from prohibition to permission, i.e., the last frame to which the security was applied, is to be encoded in the B frame mode. If the B frame mode is to be employed, program control goes to step S23. If another frame mode is employed, program control moves to step S24.

At step S23, the last frame and the frames before the last frame extending up to the P frame or the I frame are encoded in the P frame mode, and the encoded data are multiplexed with the security information. The resultant data are stored in the work area in the memory 501. Program control then goes to step S26.

At step S24, a check is performed to determine whether a frame immediately preceding the last frame to which the security was applied is to be encoded in the B frame mode. If the B frame mode is employed, program code advances to step S25. If another frame mode is employed, program control goes to step S26.

At step S25, frames up to the P frame or the I frame before the last frame are encoded in the P frame mode, and the encoded frames are multiplexed with the security information to stored the resultant data in the work area of the memory 501. Then, program control advances to step S26.

At step S26, the first frame immediately after the indicated security information was changed from prohibition to permission is encoded in the I frame mode. The encoded data are multiplexed with the security information, and the resultant data are stored in the work area in the memory 501. Program control then returns to step S11.

When the encoding process is terminated, the encoded data that have been thus generated and stored in the work area are read and stored in the storage unit 503, or are transmitted via the communication interface 305 to the communication circuit 504.

As is described above, the frame mode is changed for a frame for which, due to the indicated security, decoding is halted or resumed and for preceding and succeeding frames, and the motion compensation is not performed until, in accordance with the security, a decoding prohibition or permission instruction is issued. Therefore, without requiring a special structure for the decoding side, the deterioration of images in frames and the interruption of the decoding process can be easily prevented.

The present invention may be applied to a system constituted by a plurality of apparatuses (e.g., a host computer, an interface device, a reader, a printer, etc.) or to a single apparatus (e.g., a codec, a digital camera, etc.).

The following system or apparatus is also included with in the scope of the present invention for the implementation of the aforementioned objectives of the present invention: a software program code for implementing functions of the above embodiments is loaded into a computer (a CPU or an MPU) in an apparatus or in a system that is connected to various devices to activate these devices, and the program code is read by the computer in the system or the apparatus.

In this case, the software program code accomplishes the functions of the above described embodiment and of the program code itself, and means for supplying the program code to the computer, e.g., a storage medium on which such program code is recorded, constitute the present invention.

A storage medium for supplying such program code can be, for example, a floppy disk, a hard disk, an optical disk, a magneto-optical disk, a CD-ROM, a magnetic tape, a nonvolatile memory card, or a ROM.

In addition, the present invention includes not only a case wherein the functions in the previous embodiment can be performed when program code is read and executed by the computer, but also a case wherein, in accordance with an instruction in the program code, an OS (Operating System) running on the computer, or another application software program, the computer interacts with the program code to accomplish the functions in the above embodiments.

Furthermore, the present invention includes a case wherein program code, read from a storage medium, is written in a memory that is mounted on a function expansion board inserted into a computer, or in a function expansion unit connected to a computer, and in consonance with a program code instruction, a CPU mounted on the function expansion board or the function expansion unit performs one part, or all of the actual processing in order to implement the functions in the above described embodiments.

The format for the encoded security data, the certification method, and the method for designating a portion for the protection provided for a copyright are not limited to those in the above embodiments, and another format, another certification method and another designation method may be employed.

In other words, the forgoing description of embodiments has been given for illustrative purposes only, and is not to be construed as imposing any limitation in any respect.

The scope of the invention is, therefore, to be determined solely by the following claims, it is not limited by the text of the specifications, and alterations made that fall within the scope of the claims reflect the true spirit and the intent of the invention.

What is claimed is:

1. An image processing apparatus comprising:
   (a) input means for inputting image data;
   (b) generation means for generating security data having at least certification information and protect period information required for protecting the image data;
   (c) control means for selecting an encoding mode from among a plurality of kinds of encoding modes including at least an intraframe coding mode and an interframe coding mode, in accordance with the security data; and
   (d) encoding means for encoding the image data using the encoding mode selected by said control means.

2. An image processing apparatus according to claim 1, wherein said interframe coding mode includes a forward predictive coding mode.

3. An image processing apparatus according to claim 2, wherein said interframe coding mode includes a bidirectional predictive coding mode.

4. An image processing apparatus according to claim 1, wherein, when reproduction prohibition is changed to reproduction permission by said generation means, said control means controls the encoding modes so as to perform intraframe coding for image data immediately after reproduction is permitted.

5. An image processing apparatus according to claim 3, wherein, when reproduction permission is changed to reproduction prohibition by said security data generation means, said control means controls said encoding modes so as to at least perform forward predictive coding for image data immediately before the reproduction was prohibited.

6. An image processing apparatus according to claim 1, wherein, when reproduction permission is changed to reproduction prohibition by said generation means, said control means controls the encoding modes so as to at least perform intraframe coding for image data immediately before the reproduction was prohibited.

7. An image processing apparatus according to claim 1, wherein said image data are motion image data.

8. An image processing apparatus according to claim 7, wherein said encoding means performs an encoding process that conforms to MPEG-1.

9. An image processing apparatus according to claim 7, wherein said encoding means performs an encoding process that conforms to MPEG-2.

10. An image processing apparatus according to claim 7, wherein said encoding means performs an encoding process that conforms to H.261.

11. An image processing apparatus according to claim 7, wherein said encoding means performs an encoding process that conforms to H.263.

12. An image processing apparatus according to claim 1, wherein said encoding means divides one picture into N objects (N is a natural number), and encodes each object.

13. An image processing apparatus according to claim 12, wherein said control means controls an encoding process for each object.

14. An image processing apparatus according to claim 12, wherein said security data at least include code for identifying said object.

15. An image processing apparatus according to claim 1, wherein said security data at least include code for certifying a copyright.

16. An image processing apparatus according to claim 1, wherein image data input by said input means are image data encoded by using a plurality of encoding modes.

17. An image processing apparatus according to claim 16, wherein said image data input by said input means are data obtained by dividing one picture into N objects (N is a natural number) and by encoding each object.

18. An image processing apparatus according to claim 16, wherein said image data input by said input means are encoded data that conform to H.261.

19. An image processing apparatus according to claim 16, wherein said image data input by said input means are encoded data that conform to H.263.

20. An image processing apparatus according to claim 16, wherein said image data input by said input means are encoded data that conform to MPEG-1.

21. An image processing apparatus according to claim 16, wherein said image data input by said input means are encoded data that conform to MPEG-2.

22. An image processing method comprising the steps of:
inputting image data;
generating security data having at least certification information and protect period information required for protecting the image data;
selecting an encoding mode from among a plurality of kinds of encoding modes including at least an intraframe coding mode and an interframe coding mode, in accordance with the security data; and
encoding the image data using the encoding mode that is selected.

23. A computer-readable storage medium on which an image processing program is stored, said image processing program comprising:
 a) code for an input step of inputting image data;
 b) code for a generation step of generating security data having at least certification information and protect period information required for protecting the image data;
 c) code for a control step of selecting an encoding mode from among a plurality of kinds of encoding modes including at least an intraframe coding mode and an interframe coding mode, in accordance with said security data; and
 d) code for an encoding step of encoding the image data using the encoding mode that is selected.

24. An image processing apparatus according to claim 1, further comprising multiplexing means for multiplexing said security data and said encoded data.

25. An image processing apparatus comprising:
 (a) input means for inputting image data;
 (b) generation means for generating security data having at least protect period information required for protecting the image data;
 (c) control means for selecting an encoding mode for a frame from among a plurality of kinds of encoding modes, in accordance with the security data; and
 (d) encoding means for encoding the image data of a frame using the encoding mode selected by said control means.

* * * * *

UNITED STATES PATENT AND TRADEMARK OFFICE
CERTIFICATE OF CORRECTION

PATENT NO.     : 6,965,643 B1
DATED          : November 15, 2005
INVENTOR(S)    : Mitsuru Maeda et al.

It is certified that error appears in the above-identified patent and that said Letters Patent is hereby corrected as shown below:

Column 2,
Line 36, "of" (second occurrence) should be deleted.

Column 4,
Lines 29, 32 and 35, "presents" should read -- present --.

Column 5,
Line 66, "to" should be deleted.

Column 6,
Line 34, "include" should read -- including --.

Column 9,
Line 59, "descried" should read -- described --.

Column 18,
Line 10, "459 460" should read -- 459,460 --.

Column 20,
Line 5, "479 480" should read -- 479,480 --.

Column 21,
Line 21, "untill" should read -- until --.

Column 24,
Line 43, "stored" should read -- store --.

UNITED STATES PATENT AND TRADEMARK OFFICE
CERTIFICATE OF CORRECTION

PATENT NO. : 6,965,643 B1
DATED : November 15, 2005
INVENTOR(S) : Mitsuru Maeda et al.

It is certified that error appears in the above-identified patent and that said Letters Patent is hereby corrected as shown below:

Column 25,
Line 3, "with" should read -- within --.
Line 4, "in" should be deleted.

Signed and Sealed this

Thirtieth Day of May, 2006

JON W. DUDAS
*Director of the United States Patent and Trademark Office*